US012260983B2

(12) United States Patent
Li et al.

(10) Patent No.: US 12,260,983 B2
(45) Date of Patent: Mar. 25, 2025

(54) COIL COMPONENT

(71) Applicant: SAMSUNG ELECTRO-MECHANICS CO., LTD., Suwon-si (KR)

(72) Inventors: Yong Hui Li, Suwon-si (KR); Byung Soo Kang, Suwon-si (KR); Ju Hwan Yang, Suwon-si (KR); Seung Min Lee, Suwon-si (KR); Yoon Mi Cha, Suwon-si (KR); Boum Seock Kim, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1038 days.

(21) Appl. No.: 17/209,458

(22) Filed: Mar. 23, 2021

(65) Prior Publication Data

US 2022/0199316 A1 Jun. 23, 2022

(30) Foreign Application Priority Data

Dec. 17, 2020 (KR) ........................ 10-2020-0177130

(51) Int. Cl.

*H01F 27/29* (2006.01)
*H01F 17/00* (2006.01)
*H01F 27/32* (2006.01)

(52) U.S. Cl.

CPC ....... *H01F 27/292* (2013.01); *H01F 17/0013* (2013.01); *H01F 27/324* (2013.01); *H01F 2017/002* (2013.01)

(58) Field of Classification Search

CPC .. H01F 27/292; H01F 17/0013; H01F 27/324; H01F 2017/002

See application file for complete search history.

(56) References Cited

U.S. PATENT DOCUMENTS

| | | | | |
|---|---|---|---|---|
| 2018/0182537 | A1* | 6/2018 | Shimizu | H01F 27/29 |
| 2019/0259526 | A1* | 8/2019 | Cho | H01F 27/29 |
| 2019/0304672 | A1* | 10/2019 | Kang | H01F 27/363 |
| 2019/0311829 | A1* | 10/2019 | Kang | H01F 27/02 |
| 2019/0326041 | A1* | 10/2019 | Kawaguchi | H01F 1/06 |
| 2021/0043365 | A1* | 2/2021 | Ooi | H01F 41/0246 |
| 2021/0151248 | A1* | 5/2021 | Ohkubo | H01F 17/04 |

FOREIGN PATENT DOCUMENTS

| | | | |
|---|---|---|---|
| CN | 209087473 | U * | 7/2019 |
| KR | 10-0861103 | B1 | 10/2008 |
| KR | 10-1548862 | B1 | 8/2015 |
| KR | 10-2019-0116158 | A | 10/2019 |

* cited by examiner

*Primary Examiner* — Malcolm Barnes

(74) *Attorney, Agent, or Firm* — Morgan, Lewis & Bockius LLP

(57) ABSTRACT

A coil component is disposed. The coil component according to an aspect of the present disclosure includes: a body; a coil portion disposed in the body; an external electrode portion including a first metal layer disposed on the body, and connected to the coil portion; and a surface insulating layer disposed on the body to cover a first region of the first metal layer and open a second region of the first metal layer. Surface roughness of an interface of the first region of the first metal layer with the surface insulating layer is higher than surface roughness of an outer surface of the second region of the first metal layer.

27 Claims, 14 Drawing Sheets

COIL COMPONENT

CROSS-REFERENCE TO RELATED APPLICATION(S)

The present application claims the benefit of priority to Korean Patent Application No. 10-2020-0177130, filed on Dec. 17, 2020 in the Korean Intellectual Property Office, the disclosure of which is incorporated herein by reference in its entirety.

TECHNICAL FIELD

The present disclosure relates to a coil component.

BACKGROUND

An inductor, a type of coil component, is a representative passive electronic component used together with a resistor and a capacitor in electronic devices.

As electronic devices are designed to have higher performance and to be reduced in size, electronic components used in electronic devices have been increased in number and reduced in size.

An external electrode of the coil component is typically formed on two surfaces of the body opposing each other in a length direction, respectively. In this case, an overall length or width of the coil component may increase due to a thickness of the external electrode. In addition, when the coil component is mounted on a mounting substrate, the external electrode of the coil component may be in contact with other components disposed to be adjacent to the mounting substrate, thereby causing an electrical short-circuit.

SUMMARY

An aspect of the present disclosure is to provide a coil component capable of preventing an electrical short-circuit between other external components.

According to an aspect of the present disclosure, a coil component includes: a body; a coil portion disposed in the body; an external electrode portion including a first metal layer disposed on the body, and connected to the coil portion; and a surface insulating layer disposed on the body to cover a first region of the first metal layer and open a second region of the first metal layer. Surface roughness of an interface of the first region of the first metal layer with the surface insulating layer is higher than surface roughness of an outer surface of the second region of the first metal layer.

According to another aspect of the present disclosure, a coil component includes: a body having first and second end surfaces opposing each other and a first surface connecting the first and second end surfaces to each other; a coil portion disposed in the body; first and second external electrode portions disposed on the first and second end surfaces of the body, respectively, and connected to the coil portion, each of the first and second external electrode portions including a first metal layer extending onto the first surface of the body; and a surface insulating layer disposed on the body. The first metal layer of each of the first and second external electrode portions includes a connection portion disposed on the first and second end surfaces of the body to be connected to the coil portion, and a pad portion disposed on the first surface of the body and spaced apart from each other. The surface insulating layer covers the connection portion of each of the first and second external electrode portions and opens a portion of the pad portion of each of the first and second external electrode portions.

According to still another aspect of the present disclosure, a coil component includes: a body; a coil portion disposed in the body; an external electrode portion including a first metal layer disposed on the body, and connected to the coil portion; and a surface insulating layer disposed on the body to cover a first region of the first metal layer and open a second region of the first metal layer. The external electrode portion further includes a second metal layer disposed on the second region of the first metal layer. Surface roughness of an interface of the first region of the first metal layer with the surface insulating layer is different from surface roughness of the second region of the first metal layer with the second metal layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
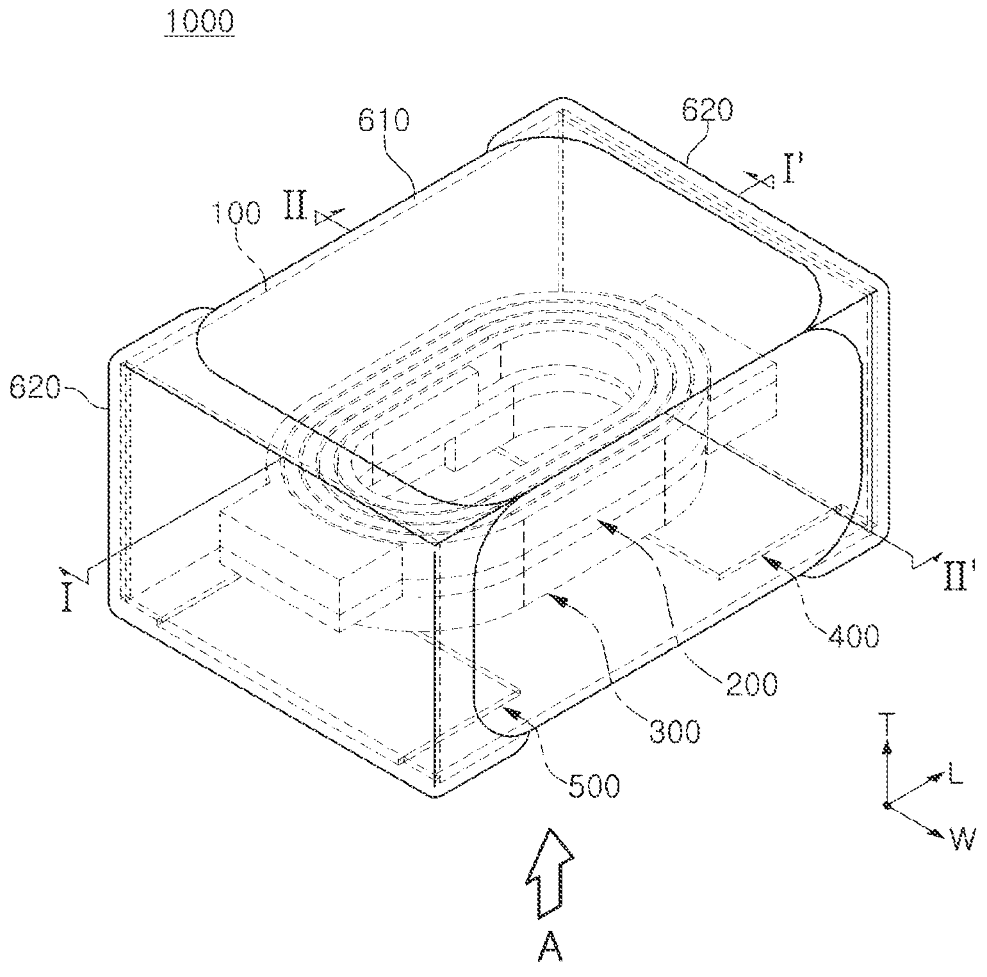
FIG. 1 is a diagram schematically illustrating a coil component according to an embodiment of the present disclosure.

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term "disposed on," "positioned on," and the like, may indicate that an element is positioned on or beneath an object, and does not necessarily mean that the element is positioned on the object with reference to a gravity direction.

The term "coupled to," "combined to," and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

Hereinafter, a coil component according to an embodiment of the present disclosure will be described with reference to the accompanied drawings, and in the description with reference to the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or the like.

In other words, in electronic devices, a coil component may be used as a power inductor, a high frequency (HF) inductor, a general bead, a high frequency (GHz) bead, a common mode filter, and the like.

Embodiment

Figure 2:
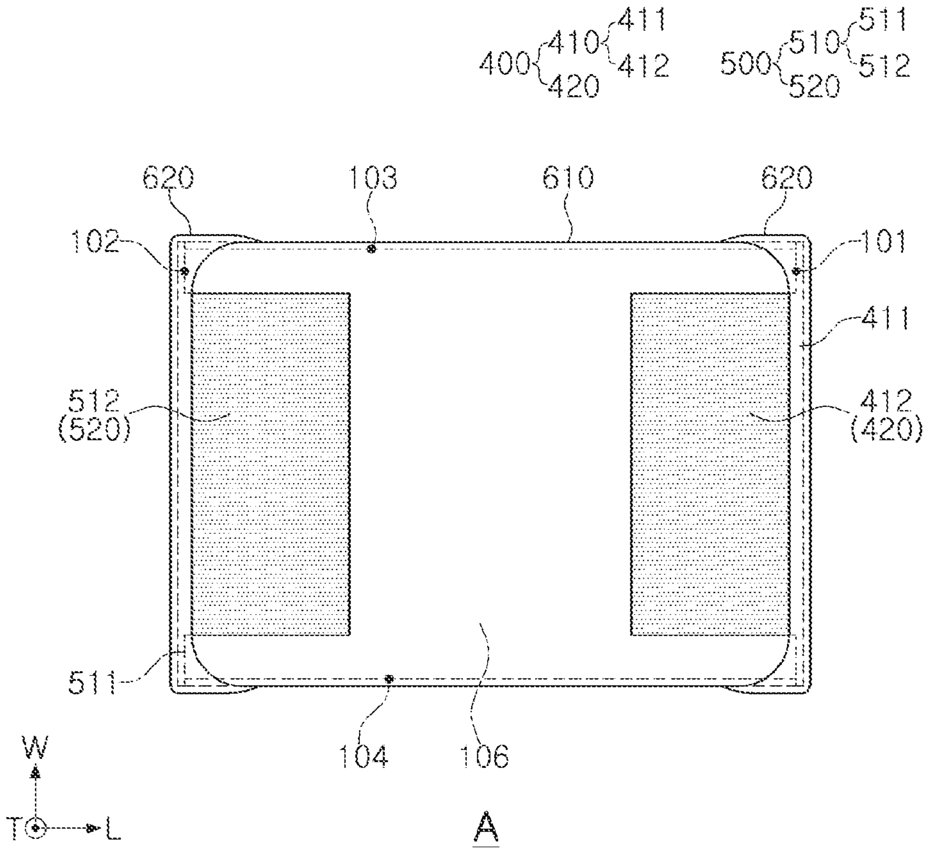
FIG. 2 is a diagram schematically illustrating what is viewed from the direction A of FIG. 1.
Figure 3:
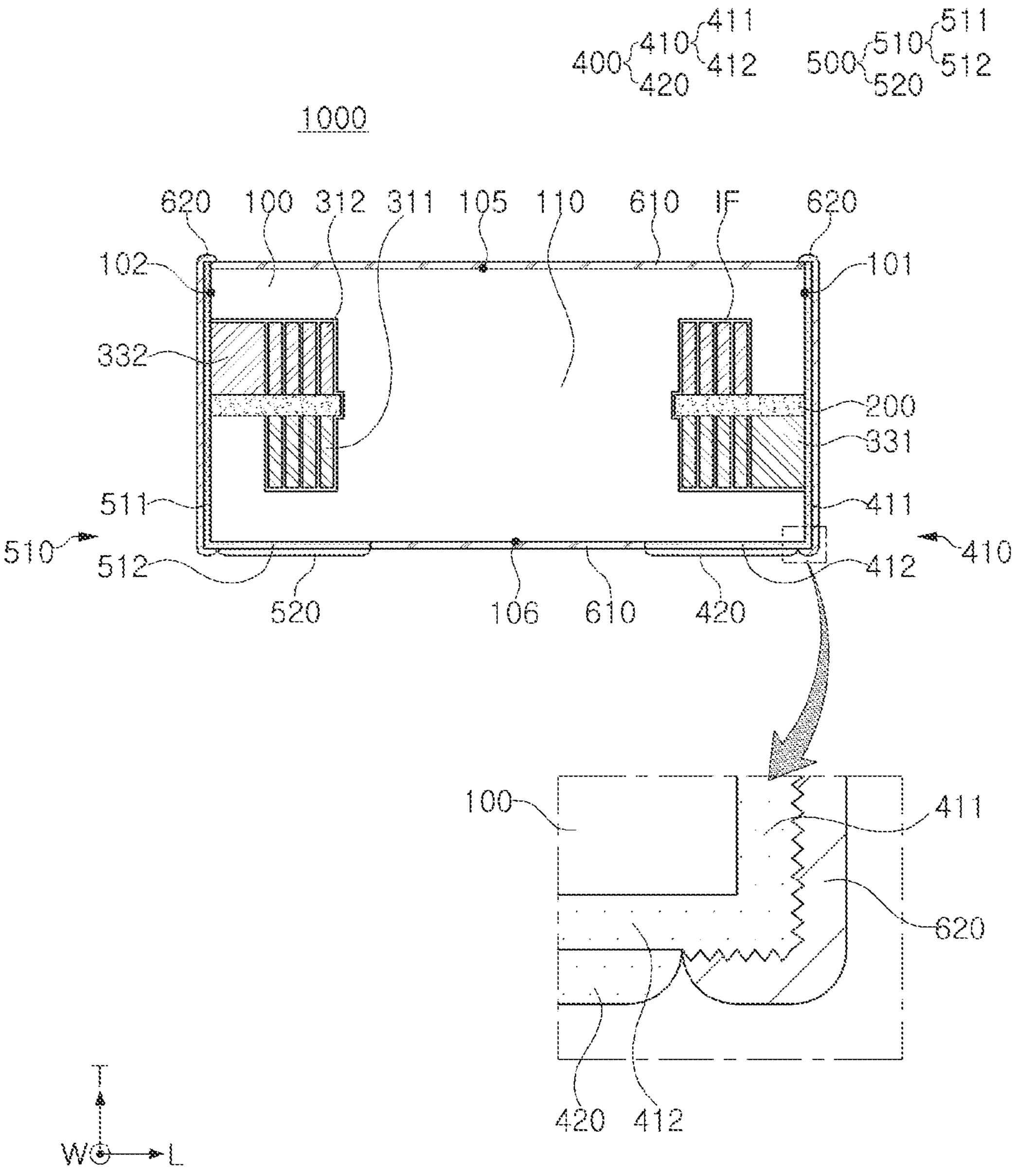
FIG. 3 is a diagram illustrating a cross-section taken along line I-I' of FIG. 1.
Figure 4:
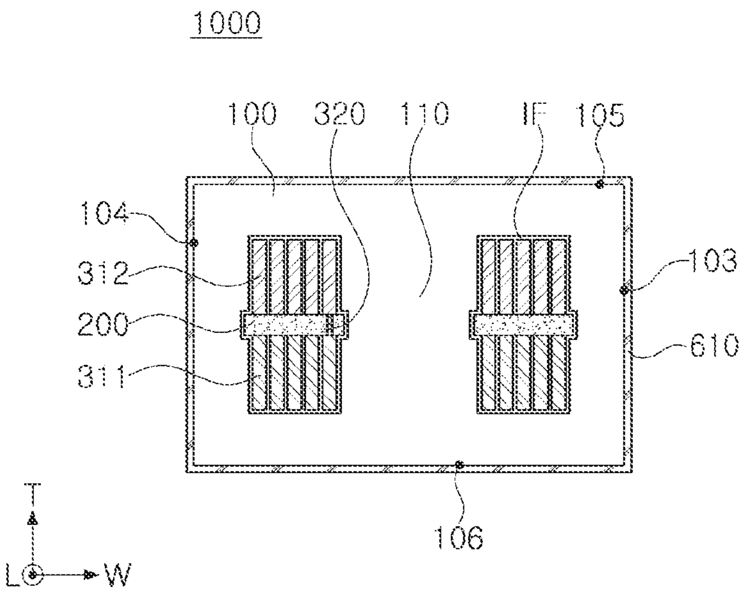
FIG. 4 is a diagram illustrating a cross-section taken along line II-II' of FIG. 1.

FIG. 1 is a diagram schematically illustrating a coil component according to an embodiment of the present disclosure. FIG. 2 is a diagram schematically illustrating what is viewed from the direction A of FIG. 1. FIG. 3 is a diagram illustrating a cross-section taken along line I-I' of FIG. 1. FIG. 4 is a diagram illustrating a cross-section taken along line II-II' of FIG. 1.

Referring to FIGS. 1 to 4, a coil component 1000 according to an embodiment of the present disclosure may include a body 100, a support substrate 200, a coil portion 300, external electrodes 400 and 500, and surface insulating layers 610 and 620, and may further include an insulating film IF.

The body 100 may form an exterior of the coil component 1000 according to the present embodiment, and the support substrate 200 and the coil portion 300 are disposed therein.

The body 100 may have a hexahedral shape as a whole.

Hereinafter, an embodiment of the present disclosure will be described on the assumption that the body 100 has a hexahedral shape. However, this description does not exclude coil components including a body formed in a shape other than a hexahedron from the scope of the present embodiment.

The body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. Two end surfaces (a first end surface and a second end surface) of the body 100 may refer to the first surface 101 and the second surface 102 of the body 100, two side surfaces (a first side surface and a second side surface) of the body 100 may refer to the third surface 103 and the fourth surface 104 of the body 100, and a first surface of the body 100 may refer to the sixth surface 106 of the body 100, and a second surface of the body 100 may refer to the fifth surface 105 of the body 100. In mounting the coil component 1000 according to the present embodiment on a mounting substrate such as a printed circuit board, or the like, the sixth surface 106 of the body 100 may be disposed to face a mounting surface of the mounting substrate to be mounted on the mounting substrate.

For example, the body 100 may be formed such that the coil component 1000 according to the present embodiment in which external electrodes 400 and 500 and surface insulating layers 610 and 620 to be described later are formed has a length of 2.0 mm, a width of 1.2 mm, and a thickness of 0.65 mm, but an embodiment thereof is not limited thereto. Meanwhile, since the dimensions of the length, width, and thickness, of the coil component described above are merely dimensions, except for process errors, and the length, width, and thickness of the actual coil component due to the process errors may be different from above-described dimensions, and it should be considered that they are within the scope of the present disclosure to the extent of the process errors may be recognized.

The length of the coil component 1000 described above may refer to a maximum value, among dimensions of a plurality of line segments, respectively connecting two outermost boundary lines of the coil component 1000 opposing each other in a length (L) direction illustrated in the cross-sectional image, and parallel to the length (L) direction, with respect to an image for a cross-section of the coil component 1000 in a length (L) direction (L)-a thickness (T) direction in a central portion of the coil component 1000 in a width direction (W), obtained by an optical microscope or a scanning electron microscope (SEM). Alternatively, the length of the coil component 1000 described above may refer to an arithmetic mean value of at least three or more dimensions, among a plurality of line segments, respectively connecting two outermost boundary lines of the coil component 1000 illustrated in the cross-sectional image, opposing each other in a length (L) direction illustrated in the cross-sectional image, and parallel to the length (L) direction of the coil component 1000.

The thickness of the coil component 1000 described above may refer to a maximum value, among dimensions of a plurality of line segments, respectively connecting two outermost boundary lines of the coil component 1000 illustrated in the cross-sectional image, and parallel to a thickness (T) direction of the coil component 1000, with reference to an image for a cross-section of the coil component 1000 in a length (L) direction-a thickness (T) direction in a central portion of the coil component 1000 in a width direction (W), obtained by an optical microscope or a scanning electron microscope (SEM). Alternatively, the thickness of the coil component 1000 described above may refer to an arithmetic mean value of at least three or more dimensions, among a plurality of line segments, respectively connecting an outermost boundary line of the coil component 1000 illustrated in the cross-sectional image, and parallel to the thickness (T) direction of the coil component 1000.

The width of the coil component 1000 described above may be a maximum value, among dimensions of a plurality of line segments, respectively connecting two outermost boundary lines of the coil component 1000 illustrated in the cross-sectional image, and parallel to the width (W) direction of the coil component 1000, with reference to an image for a cross-section of the coil component 1000 in a length (L) direction-a thickness (T) direction in a central portion of the coil component 1000 in a width (W) direction, obtained by an optical microscope or a scanning electron microscope (SEM). Alternatively, the width of the coil component 1000 described above may refer to an arithmetic mean value of at least three or more dimensions, among a plurality of line segments, respectively connecting two outermost boundary lines of the coil component 1000 illustrated in the cross-sectional image, and parallel to the width (W) direction of the coil component 1000.

Alternatively, each of the length, the width, and the thickness of the coil component 1000 may be measured by a micrometer measurement method. The micrometer measurement method may measure sizes by setting a zero point using a Gage repeatability and reproducibility (R&R) micrometer, inserting the coil component 1000 according to the present embodiment into a space between tips of the micrometer, and turning a measurement lever of the micrometer. Meanwhile, when the length of the coil component 1000 is measured by the micrometer measurement method, the length of the coil component 1000 may refer to a value measured one time, or may refer to an arithmetic means of values measured multiple times. The same configuration may also be applied to the width and the thickness of the coil component 1000.

The body 100 may include a magnetic material. Specifically, the body 100 may be formed by laminating one or more magnetic composite sheets in which a magnetic material is dispersed in a resin. However, the body 100 may have a structure other than the structure in which the magnetic material is dispersed in the resin. For example, the body 100 may also be formed of a magnetic material such as ferrite or a non-magnetic material.

The magnetic material may be ferrite or magnetic metal powder particles.

The ferrite powder may include, for example, at least one or more materials among a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder particles may include one or more elements selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may be one or more materials among a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder particles may be amorphous or crystalline. For example, the magnetic metal powder particles may be Fe—Si—B—Cr amorphous alloy powder, but is not limited thereto.

The magnetic metal powder particles may have an average diameter of about 0.1 μm to 30 μm, respectively, but is not limited thereto. Meanwhile, the average diameter of the magnetic metal powder particles may refer to a particle size distribution of particles represented by D50 or D90.

The body 100 may include two or more types of magnetic materials dispersed in a resin. Here, the notion that types of the magnetic materials are different may indicate that the magnetic materials dispersed in the resin are distinguished from each other by one of an average diameter, a composition, crystallinity, and a shape.

The resin may include one of an epoxy, a polyimide, a liquid crystal polymer, or a mixture thereof, but is not limited thereto.

The body 100 may include a core 110 penetrating through the coil portion 300 and the support substrate 200 to be described later. The core 110 may be formed by filling a through-hole penetrating through a central portion of each of the coil portion 300 and the support substrate 200 with a magnetic composite sheet, but is not limited thereto.

The support substrate 200 is disposed in the body 100, and supports the coil portion 300 to be described later.

The support substrate 200 may be formed of an insulating material including at least one of a thermosetting insulating resin such as an epoxy resin, a thermoplastic insulating resin such as a polyimide, and a photosensitive insulating resin, or may be formed of an insulating material in which a reinforcing material such as a glass fiber or an inorganic filler is impregnated with such an insulating resin. For example, the support substrate 200 may be formed of an insulating material such as prepreg, Ajinomoto Build-up Film (ABF), FR-4, a bismaleimide triazine (BT) resin, a photoimageable dielectric (PID), and the like, but is not limited thereto.

As an inorganic filler, at least one or more elements selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide improved stiffness. When the support substrate 200 is formed of an insulating material which does not include a glass fiber, it is advantageous that the support substrate 200 may reduce an overall thickness of the coil portion 200. When the support substrate 200 is formed of an insulating material including a photosensitive insulating resin, the number of processes for forming the coil portion 300 is reduced, which is advantageous in reducing production costs, and fine hole processing can be performed.

The coil portion 300 may be disposed in the body 100 to exhibit characteristics of the coil component. For example, when the coil component 1000 according to the present embodiment is used as a power inductor, the coil portion 300 may serve to stabilize power supply of electronic devices by storing an electric field as a magnetic field and maintaining an output voltage.

The coil portion 300 is formed in at least one of both surfaces of the support substrate 200 opposing each other, and forms at least one turn. The coil portion 300 is formed on one surface and the other surface of the support substrate 200 opposing each other in the thickness direction T of the body 100. In the present embodiment, the coil portion 300 includes a first coil pattern 311 and a first lead-out pattern 331 disposed on one surface of the support substrate 200 opposing the sixth surface 106 of the body 100, a second coil pattern 312 and a second lead-out pattern 332 disposed on the other surface of the support substrate 200, a via 320 penetrating through the support substrate 200 and connecting an inner end portion of each of the first coil pattern 311 and the second coil pattern 312. As a result, the coil portion 300 applied to the present embodiment may be formed as a single coil generating a magnetic field in the thickness direction T of the body 100 centered on a core 110.

Each of the first coil pattern 311 and the second coil pattern 312 may have a planar spiral shape in which at least one turn is formed around the core as an axis. For example, based on a direction of FIGS. 1, 3 and 4, the first coil pattern 311 may form at least one turn around the core 110 as an axis on the lower surface of the support substrate 200. The second coil pattern 312 may form at least one turn around the core 110 as an axis on the upper surface of the support substrate 200.

The lead-out patterns 331 and 332 are connected to the coil patterns 311 and 312 and are exposed to the first and second surfaces 101 and 102 of the body 100, respectively. Specifically, the first lead-out pattern 331 is disposed on one surface of the support substrate 200 to be connected to the first coil pattern 311, and is exposed to the first surface 101 of the body 100. The second lead-out pattern 332 is disposed on the other surface of the support substrate 200 to be connected to the second coil pattern 312, and is exposed to the second surface 102 of the body 100. The lead-out patterns 331 and 332 are exposed to the first and second surfaces 101 and 102 of the body 100 and are connected to be in contact with first metal layers 410 and 510 of external electrodes 400 and 500, to be described later.

At least one of the coil patterns 311 and 312, the via 320, and the lead-out patterns 331 and 332 may include at least one or more conductive layers.

For example, when the second coil pattern 312, the via 320, and the second lead-out pattern 332 are formed by plating, each of the second coil pattern 312, the via 320, and the second lead-out pattern 332 may include a seed layer, formed by vapor deposition such as electroless plating or sputtering, and an electroplating layer, respectively. Here, the electroplating layer may have a single layer structure or a multilayer structure. The electroplating layer with a multilayer structure may have a conformal film structure in which one electroplating layer is formed along a surface of the other electroplating layer, and may have a form in which the other electroplating layer is laminated only on one side of one electroplating layer. The seed layer may be formed by a vapor deposition method such as electroless plating, sputtering, or the like. The seed layer of each of the second coil pattern 312, the via 320, and the second lead-out pattern 332 may be integrally formed, such that a boundary therebetween may not be formed, but is not limited thereto. The electroplating layer of each of the second coil pattern 312, the via 320, and the second lead-out pattern 332 may be integrally formed, such that a boundary therebetween may not be formed, but is not limited thereto.

As another example, when the first coil pattern 311 and the first lead-out pattern 331, and the second coil pattern 312 and the second lead-out pattern 332 are formed separately from each other and are then collectively stacked on the support substrate 200 to form a coil portion. 300, the via 320 may include a high melting-point metal layer and a low melting-point metal layer having a lower melting point than the high melting-point metal layer. Here, the low melting-point metal layer may be formed of solder including lead (Pb) and/or tin (Sn). At least a portion of the low melting-point metal layer may be melted due to the pressure and temperature during batch lamination, such that an intermetallic compound layer (IMC layer) may be formed at a boundary between the low melting-point metal layer and the second coil pattern 312.

For example, the first coil pattern 311 and the first lead-out pattern 312 and the second coil pattern 331 and the second lead-out pattern 332 may be formed to protrude from the lower and upper surfaces of the support substrate 200, respectively, as illustrated in FIGS. 3 and 4. As another example, the first coil pattern 311 and the first lead-out pattern 331 may be buried in the lower surface of the support substrate 200, so that the lower surface thereof is exposed to the lower surface of the support substrate 200, and the second coil pattern 312 and the second lead-out pattern 332 may be formed to protrude from the upper surface of the support substrate 200. In this case, a concave portion may be formed on the lower surface of each of the first coil pattern 312 and the first lead-out pattern 331, such that the lower surface of the support substrate 200 and the lower surface of each of the first coil pattern 311 and the first lead-out pattern 331 may not be located on the same plane. As another example, the first coil pattern 311 and the first lead-out pattern 331 may be formed to protrude from the lower surface of the support substrate 200, and the second coil pattern 312 and the second lead-out pattern 332 may be buried in the upper surface of the support substrate 200 such that the upper surface thereof may be exposed to the upper surface of the support substrate 200. In this case, a concave portion may be formed on the upper surface of each of the second coil pattern 312 and the second lead-out pattern 332, such that the upper surface of the support substrate 200 and the upper surface of each of the second coil pattern 312 and the second lead-out pattern 332 may not be located on the same plane. As another example, the first coil pattern 311 may be buried in the lower surface of the support substrate 200, such that the lower surface thereof may be exposed to the lower surface of the support substrate 200, and the second coil pattern 312 may be buried in the upper surface of the support substrate 200, such that the upper surface thereof may be exposed to the upper surface of the support substrate 200.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), chromium (Cr), or an alloy thereof, but an embodiment thereof is not limited thereto.

The insulating film IF may be formed along a surface of the support substrate 200, and the coil portion 300. The insulating film IF may be a film to protect the coil portion 300, and insulate the coil portion 300 from the body 100 including a conductive magnetic material, and may include a known insulating material such as parylene, or the like. Any insulating material included in the insulating film IF may be used, and there is no particular limitation. The insulating film IF may be formed by a vapor deposition method, but is not limited thereto, and may be formed by laminating an insulating film on both surfaces of the support substrate 200.

The external electrode portions 400 and 500 include first metal layers 410 and 510 disposed on the body 100, and are connected to the coil portion 300. In the present embodiment, the external electrode portions 400 and 500 include the first metal layers 410 and 510, respectively, and include first and second metal layers 420 and 520 disposed on the sixth surface 106 of the body 100 to be spaced apart from each other. Specifically, the first external electrode 400 may include a first metal layer 410 including a first connection portion 411 disposed on the first surface 101 of the body to be in contact with the first lead-out pattern 331 and a first pad portion 412 connected to the first connection portion 411 and disposed on the sixth surface 106 of the body 100, and a second metal layer 420 disposed on the first pad portion 412 of the first metal layer 410. The second external electrode 500 may include a first metal layer 510 including a second connection portion 511 disposed on the second surface 102 of the body 100 to be in contact with the second lead-out pattern 332 and a second pad portion 512 connected to the second connection portion 511 and disposed on the sixth surface 106 of the body 100, and a second metal layer 520 disposed on the second pad portion 512 of the first metal layer 510. The pad portions 412 and 512 of the first metal layers 410 and 510 are disposed on the sixth surface 106 of the body to be spaced apart from each other. In one example, a width of the connection portions 411 and 511 is larger than a width of the pad portions 412 and 512.

The first metal layers 410 and 510 of the external electrodes 400 and 500 may be formed on the surface of the body 100 by electroplating after forming a plating resist on the surface of the body 100. When the body 100 includes magnetic metal powder particles, the magnetic metal powder particles may be exposed to the surface of the body 100. Due to the magnetic metal powder particles exposed to the surface of the body 100, conductivity may be imparted to the surface of the body 100 during electroplating, and the first metal layers 410 and 510 may be formed on the surface of the body 100 by electroplating.

The connection portions 411 and 511 and the pad portions 412 and 512 of the first metal layers 410 and 510 may be formed by the same plating process, so that a boundary may not be formed therebetween. That is, the first connection portion 411 and the first pad portion 412 may be integrally formed with each other, and the second connecting portion 511 and the second pad portion 512 may be integrally formed. In addition, the connection portions 411 and 511 and the pad portions 412 and 512 may be formed of the same metal. However, this description does not exclude from the scope of the present disclosure the case in which the connection portions 411 and 511 and the pad portions 412 and 512 are formed by different plating processes to form a boundary therebetween. The first metal layers 410 and 510 may be formed of a conductive material such as copper (Cu), aluminum (Al), silver (Ag), tin (Sn), gold (Au), nickel (Ni), lead (Pb), titanium (Ti), chromium (Cr), or an alloy thereof, but an embodiment thereof is not limited thereto. As a non-limiting example, the first metal layers 410 and 410 may be copper (Cu) plating layers.

The first metal layers 410 and 510 may be formed in a thickness range of 0.3 μm to 10 μm. When the thickness of the first metal layers 410 and 510 is less than 0.3 μm, detachment and peeling of the external electrode portions 400 and 500 may occur when a substrate is mounted, and connection reliability between the coil portion 300 and the external electrode portions 400 and 500 may be deteriorated. When the thickness of the first metal layers 410 and 510 exceeds 10 μm, it is disadvantageous for thinning of the coil component, and process efficiency may decrease.

The second metal layers 420 and 520 are disposed on the pad portions 412 and 512 of the first metal layers 410 and 510. The second metal layer 420 of the first external electrode 400 is disposed on the first pad portion 412, and the second metal layer 520 of the second external electrode 400 is disposed on the second pad portion 512 of the second metal layer 520. The second metal layers 420 and 520 may be plating layer grown on the pad portions 412 and 512 exposed externally by surface insulating layers 610 and 620 to be described later. For example, each of the second metal layers 420 and 520 may include a nickel (Ni) plating layer disposed on the pad portions 412 and 512 and a tin (Sn) plating layer disposed on the nickel (Ni) plating layer, but the scope of the present disclosure is not limited thereto.

The second metal layers 420 and 520 may be formed in a thickness range of 0.3 μm to 10 μm. When the thickness of the second metal layers 420 and 520 is less than 0.3 μm, detachment and peeling of the second metal layers 420 and 520 may occur when the substrate is mounted, and connection reliability between the coil portion 300 and the external electrode portions 400 and 500 may be deter orated. When the thickness of the second metal layers 420 and 520 exceeds 10 μm, it is disadvantageous for thinning of the coil component, and process efficiency may decrease.

The surface insulating layers 610 and 620 are disposed on the body 100 to cover one region of the first metal layers 410 and 510 and open the other region of the first metal layers 410 and 510. In the present embodiment, the surface insulating layers 610 and 620 may include a first insulating layer 610 and a second insulating layer 620, and the first insulating layer 610 may cover the connection portions 411 and 511 of the first metal layers 410 and 510, together with the second insulating layer 620, and open at least a portion of each of the pad portions 412 and 512 of the first metal layers 410 and 510.

The first insulating layer 610 is disposed on the sixth surface 106 of the body 100 to open at least a portion of each of the pad portions 412 and 512. In the present embodiment, the first insulating layer 610 may cover the first to sixth surfaces 101, 102, 103, 104, 105, and 106 of the body 100, excluding a region in which the first metal layers 410 and 510 are disposed. Specifically, in the present embodiment, since the first metal layers 410 and 510 are disposed on a portion of the first and second surfaces 101 and 102 and the sixth surface 106 of the body 100, the first insulating layer 610 may cover each of the third to fifth surfaces 103, 104 and 105 of the body 100, and may be disposed in a region of the sixth surface 106 of the body 100 except for the region in which the pad portions 412 and 512 are disposed. The first insulating layer 610 disposed on each of the third to sixth surfaces 103, 104, 105, and 106 of the body 100 may be formed together in the same process so that a boundary may not be formed therebetween, but the scope of the present disclosure is not limited thereto. The first insulating layer 610 may function as a plating resist when the first metal layers 410 and 510 of the external electrodes 400 and 500 are formed by plating on the surface of the body 100. Accordingly, the first insulating layer 610 may be formed on the surface of the body 100 earlier than the first metal layers 410 and 510 of the external electrodes 400 and 500, such that a region in which the first metal layers 410 and 510 are to be formed on the surface of the body 100 may be defined. However, the scope of the present disclosure is not limited thereto.

The first insulating layer 610 may include a thermoplastic resin such as polystyrene, vinyl acetate, polyester, polyethylene, polypropylene, polyamide, rubber, acrylic, or the like, a thermosetting resin such as phenolic, epoxy, urethane, melamine, alkyd, or the like, a photosensitive resin, parylene, $SiO_x$ or $SiN_x$.

The first insulating layer 610 may have an adhesive function. For example, when the first insulating layer 610 is formed by laminating an insulating film on the body, the insulating film may include an adhesive component and may be adhered to the surface of the body 100. In this case, an adhesive layer may be separately formed on one surface of the first insulating layer 610. However, a separate adhesive layer may not be formed on one surface of the first insulating layer 610, such as a case when the first insulating layer 610 is formed using an insulating film in a semi-cured state (B-stage).

The first insulating layer 610 may be formed by applying a liquid insulating resin to the surface of the body 100, or applying an insulating paste to the surface of the body 100, or laminating the insulating the insulating film on the surface of the body 100, or forming an insulating resin on the surface of the body 100 by vapor deposition. In the case of the insulating film, a dry film (DF) including a photosensitive insulating resin, an Ajinomoto Build-up Film (ABF), a polyimide film, or the like, that does not include a photosensitive insulating resin may be used.

The first insulating layer 610 may be formed within a thickness range of 10 nm to 100 μm. When the thickness of the first insulating layer 610 less than. 10 nm, characteristics of the coil component such as a decrease in Q factor, a decrease in breakdown voltage, a decrease in self-resonant frequency (SRF), and the like may decrease. On the other hand, when the thickness of the first insulating layer 610 exceeds 100 μm, the total length, width, and thickness of the coil component may increase, which is disadvantageous for thinning, and an effective volume of the magnetic material may decrease compared to the component of the same volume, which may deteriorate component characteristics.

The second insulating layer 620 may be disposed on each of the first and second surfaces 101 and 102 of the body 100 to cover the connection portions 411 and 511 of the first metal layers 410 and 510, and may open at least a portion of the pad portions 412 and 512 of the first metal layers 410 and 510. The second insulating layer 620 may function as a plating resist together with the first insulating layer 610, when the second metal layers 420 and 520 of the external electrodes 400 and 500. Accordingly, the second insulating layer 620 may be formed to cover the connection portions 411 and 511 and open the pad portions 412 and 512 after the first metal layers 410 and 510 of the external electrodes 400 and 500 are formed, such that a region in which the second metal layers 420 and 520 are to be formed together with the first insulating layer 610 may be defined. However, the scope of the present disclosure is not limited thereto.

Since the surface roughness of the interface of the connection portions 411 and 511, in contact with the second insulating layer 620 is formed to be higher than the surface roughness of the outer surfaces of the pad portions 412 and 512, bonding force between the first metal layers 410 and 510 and the second insulating layer 620 may be improved to prevent an electrical short-circuit between other components and the coil component 1000 according to the present embodiment, while component characteristics may be improved by reducing contact resistance between the first metal layers 410 and 510 and the second metal layers 420 and 520.

The surface roughness may refer to a value obtained by calculating an arithmetic mean of an absolute value of the height from a virtual center line in the corresponding cross-section (center line average roughness Ra). However, the surface roughness of the present disclosure is not limited to the center line average roughness (Ra), but may refer to ten point average roughness (Rz) or maximum height roughness (Ry).

The surface roughness Ra of the interface of the connection portions 411 and 511, in contact with the second insulating layer 620 may be 150 to 500 nm. That is, the surface roughness of the connection portions 411 and 511 may be 150 to 500 nm. When the surface roughness Ra of the connection portions 411 and 511 is less than 150 nm, it may be difficult to secure sufficient physical bonding force with the second insulating layer 620. On the other hand, when the surface roughness Ra of the connection portions 411 and 511 exceeds 500 nm, there is a concern that the thickness of the connection portions 411 and 511 may be too increased, and there is a concern that cracks may occur in the connection portions 411 and 511.

Meanwhile, the method of imparting surface roughness to the connection portions 411 and 511 is not particularly limited. For example, in order to impart surface roughness to the connection portions 411 and 511, a physical processing method may be used, or a chemical processing method such as anisotropic etching may be used. In addition, an oxide may be formed to impart surface roughness to the connection portions 411 and 511, or rough plating may be performed by changing plating process conditions to impart surface roughness.

For example, the connection portions 411 and 511 may include copper oxide(I) ($Cu_2O$) at an interface, in contact with the second insulating layer 620. As a method of forming an oxide to impart surface roughness, when a black oxide is used, the connection portions 411 and 511 may include copper oxide(I) ($Cu_2O$) at the interface, in contact with the second insulating layer 620, and surface roughness may be formed in a shape in which ends of a protruding portion and a concave portion are blunt, and heights of the protruding portion and the concave portion are relatively low.

As another example, the connection portions 411 and 511 may include copper oxide (II) (CuO) at an interface, in contact with the second insulating layer 620. As a method of forming an oxide to impart surface roughness, when a brown oxide is used, the connection portions 411 and 511 may include copper oxide (II) (CuO) at the interface, in contact with the second insulating layer 620, and the surface roughness may be formed in a shape in which ends of a protruding portion and a concave portion are sharp, and heights of the protruding portion and the concave portion are relatively long.

The second insulating layer 620 may include a thermoplastic resin such as polystyrene, vinyl acetate, polyester, polyethylene, polypropylene, polyamide, rubber, acrylic, or the like, a thermosetting resin such as phenolic, epoxy, urethane, melamine, alkyd, or the like, a photosensitive resin, a parylene, $SiO_x$ or $SiN_x$.

The second insulating layer 620 may have an adhesive function. For example, when the second insulating layer 620 is formed by laminating the insulating film on the body 100, the insulating film may include an adhesive component and may be adhered to the surface of the body 100. In this case, an adhesive layer may be separately formed on one surface of the second insulating layer 620. However, a separate adhesive layer may not be formed on one surface of the second insulating layer 620, such as a case when the second insulating layer 620 is formed using an insulating film in a semi-cured state (B-stage).

The second insulating layer 620 may be formed by applying a liquid insulating resin to the surface of the body 100, applying an insulating paste to the surface of the body 100, laminating an insulating film on the surface of the body 100, or forming an insulating resin on the surface of the body 100 by vapor deposition. Alternatively, the second insulating layer 620 may be formed by disposing a material for forming a second insulating layer on a silicon die, or the like and then stamping the body 100 on the silicon die. In the case of the insulating film, a dry film (DF) including a photosensitive insulating resin, an Ajinomoto Build-up Film (ABF), a polyimide film, or the like, that does not include a photosensitive insulating resin may be used.

The second insulating layer 620 may be formed in a thickness range of 10 nm to 100 μm. When the thickness of the second insulating layer 620 is less than 10 nm, characteristics of the coil component such as a decrease in Q factor, a decrease in break down voltage, a decrease in self-resonant frequency (SRF), and the like may decrease, and when the thickness of the second insulating layer 620 exceeds 10 μm, the total length, width, and thickness of the coil component may increase, which is disadvantageous for thinning, and an effective volume of the magnetic material may decrease compared to the component of the same volume, which may deteriorate component characteristics.

The second insulating layer 620 may be formed on the first and second surfaces 101 and 102 of the body 100 to cover the connection portions 411 and 511, and may be disposed to extend to at least a portion of the third to sixth surfaces 103, 104, 105, and 106 of the body 100. For example, the second insulating layer 620 disposed on the first surface 101 of the body 100 so as to cover the first connection portion 411 may cover the first surface 101 of the body 100 and may be formed to extend to at least a portion of each of the third to sixth surfaces 103, 104, 105, and 106 of the body 100. In this case, a portion of the second insulating layer 620 extending to at least a portion of each of the third to sixth surfaces 103, 104, 105, and 106 of the body 100 may be formed to be longest in a corner region formed by two surfaces among the third to sixth surfaces 103, 104, 105, and 106 of the body 100, to cover a vertex region formed by three surfaces among surfaces among the first surface 101 and the third to sixth surfaces 103, 104, 105, and 106 of the body 100. For example, a portion of the second insulating layer 620 disposed on the first surface 101 of the body 100 extending to the third surface 103 of the body 100 may be formed to be longest in the corner region formed by the third surface 103 of the body 100 with each of the fifth and sixth surfaces 105 and 106 of the body 100. In addition, a portion of the second insulating layer 620 disposed on the first surface 101 of the body 100 extending to the fifth surface 105 of the body 100 may be formed to be the longest in the corner region formed by the fifth surface 105 of the body 100 with each of the third and fourth surfaces 103 and 104 of the body 100. In addition, a portion of the second insulating layer 620 disposed on the first surface 101 of the body 100 extending to the sixth surface 106 of the body 100 may be formed to be the longest in the corner region formed by the sixth surface 105 of the boy 100 with each of the third and fourth surfaces 103 and 104 of the body 100. Accordingly, the second insulating layer 620 disposed on the first surface 101 of the body 100 may cover a vertex region formed by the first surface 101, the third surface 103, and the fifth surface 105 of the body 100, a vertex region formed by the first surface 101, the fourth surface 104, and the fifth surface 105 of the body 100, a vertex region formed by the first surface 101, the third surface 103, and the sixth surface 105 of the body 100, and a vertex region formed by the first surface 101, the fourth surface 104, and the sixth surface 106 of the body 100. In general, there is a high probability that cracks may exist due to stress concentration at corners and vertices, which are boundaries between surfaces of the body, and there is a high probability that the conductive metal magnetic powder is exposed. Cracks and exposed magnetic metal powder particles may serve as a transmission path for a leakage current, which may cause an electrical short-circuit between external electrodes of the component, thereby deteriorating component characteristics. In the present embodiment, the second insulating layer 620 disposed on each of the first and second surfaces 101 and 102 of the body 100 may extend to at least a portion of each of the third to sixth surfaces 103, 104, 105, and 106 of the body 100, and may be disposed in the longest shape in the corner region between the surfaces, so that the above-described problem can be solved.

Meanwhile, in FIGS. 1 to 3, it is illustrated that the connection portions 411 and 511 of the first metal layers 410 and 510 may be formed to cover the entire first and second surfaces 101 and 102 of the body 100, and the pad portions 412 and 512 of the first metal layers 410 and 510 may be formed to be spaced apart from each of the third and fourth surfaces 103 and 104 of the body 100 in the width direction W, but this is merely an example. That is, the position and shape of the first metal layers 410 and 510 may be variously modified according to the patterned position and shape of the plating resist formed on the surface of the body 100 to plate the first metal layers 410 and 510. For example, the first connection portion 411 of the first metal layer 410 of the first external electrode 400 may be modified to be spaced apart from the third surface 103 and/or the fourth surface 104 and/or the fifth surface 150 of the body 100 on the first surface 101 of the body 100. As another example, the first pad portion 412 of the first metal layer 410 of the first external electrode 400 may be modified from only one of the third surface 103 and the fourth surface 104 of the body 100 on the sixth surface 106 of the body 100, or may be modified to extend to the corner region between each of the third and fourth surfaces 103 and 104 and the sixth surface 106 of the body 100 on the sixth surface 106 of the body 100. As another example, the first metal layer 410 of the first external electrode 400 may be modified to include an extension portion extending from the first connection portion 411 to at least one of third to fifth surfaces 103, 104, and 105 of the body 100. As another example, the first metal layer 410 of the first external electrode 400 may not include the first connection portion 411 described above, but may be modified to include only the pad portion 412.

Other Embodiments and Modified Examples

Figure 5:
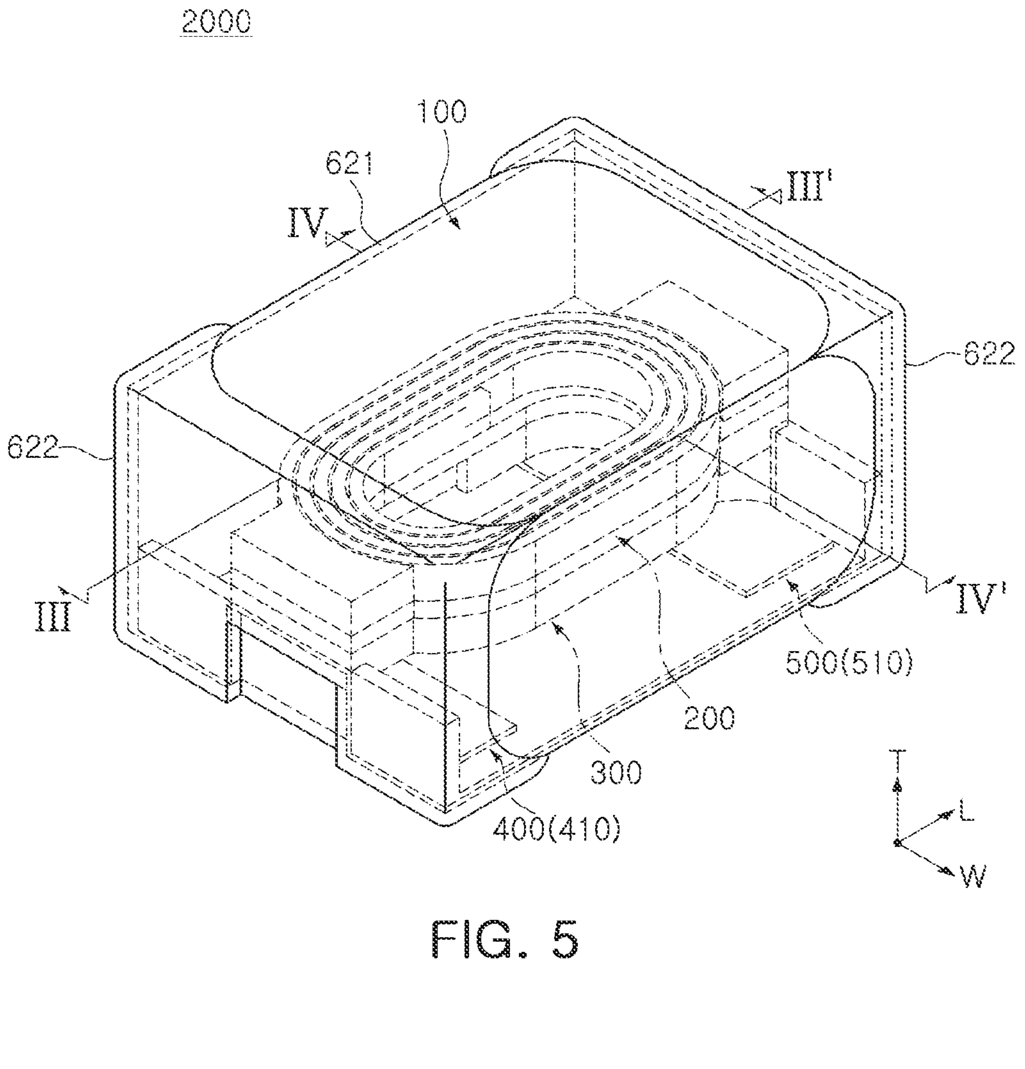
FIG. 5 is a diagram schematically illustrating a coil component according to another embodiment of the present disclosure.
Figure 6:
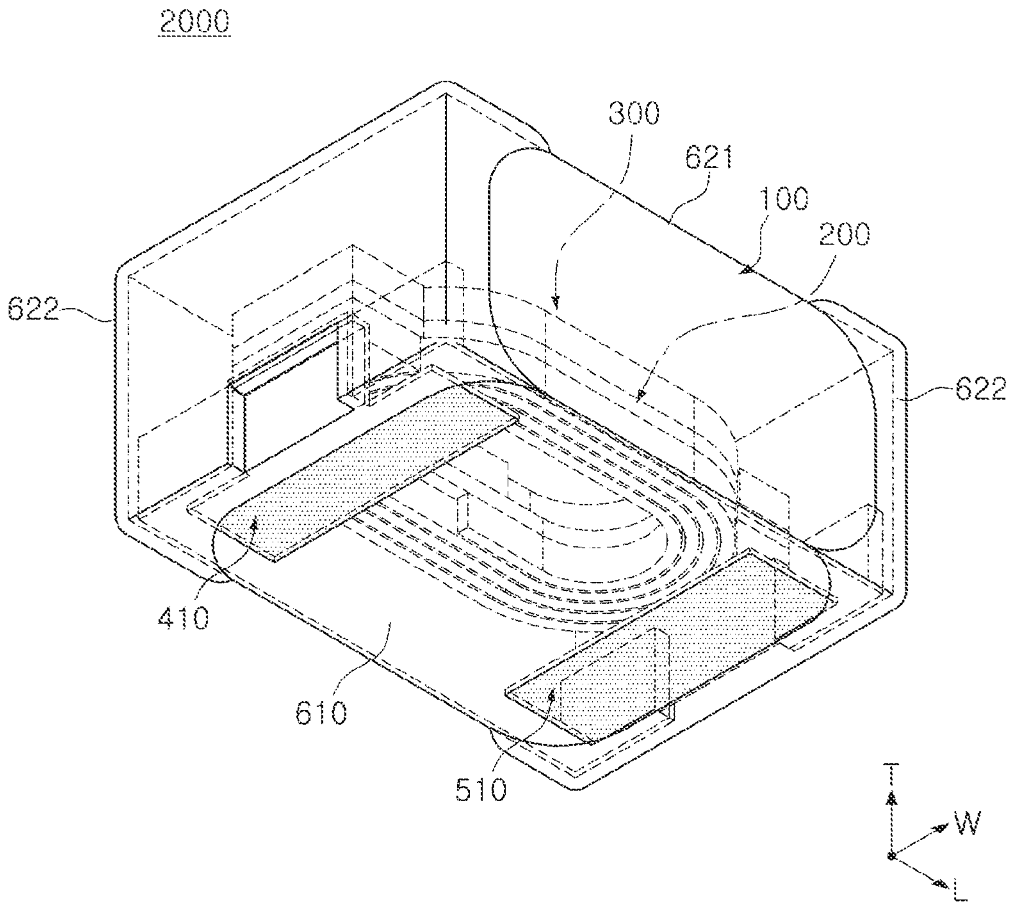
FIG. 6 is a diagram illustrating a coil component according to another embodiment of the present disclosure as viewed from a lower side.
Figure 7:
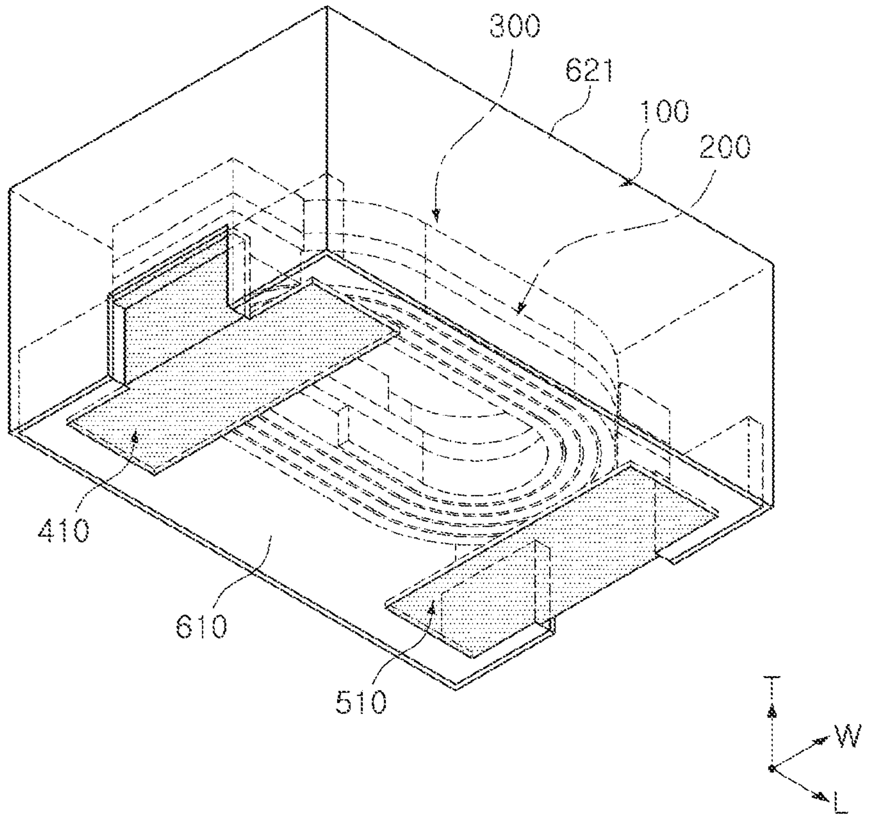
FIG. 7 is a diagram illustrating that a portion of second insulating layers are omitted in FIG. 6.
Figure 8:
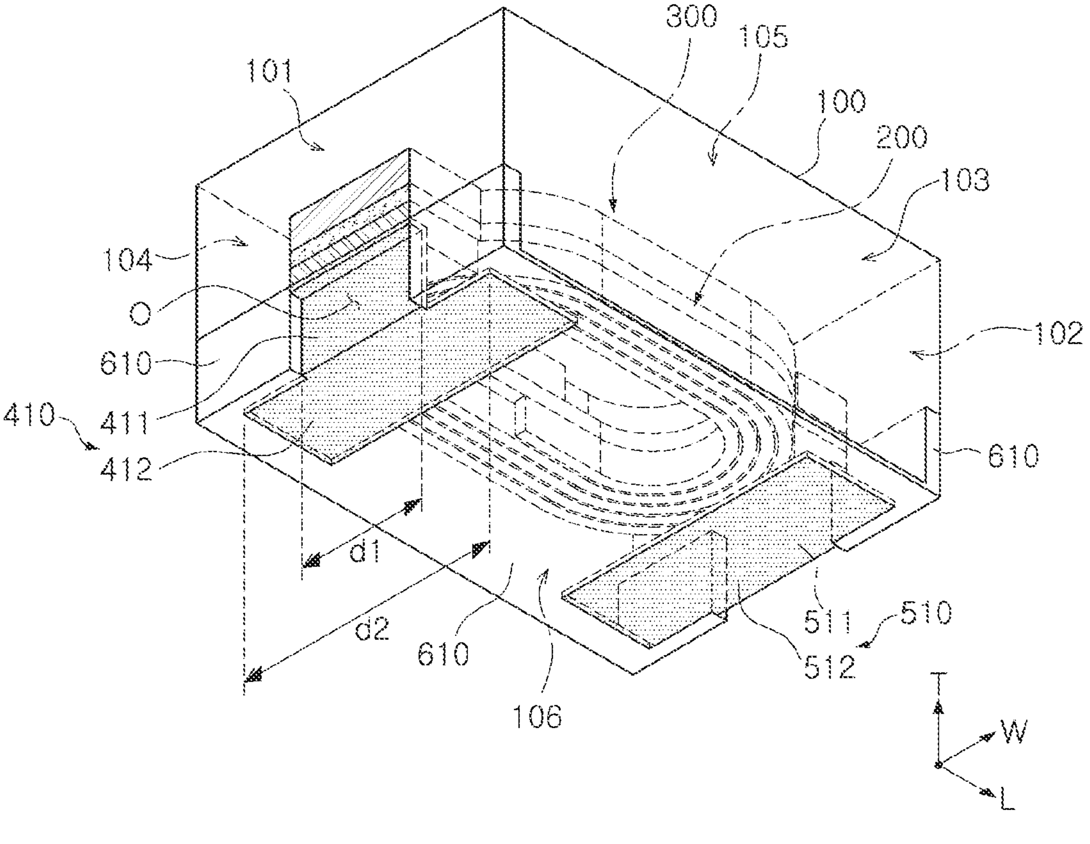
FIG. 8 is a diagram illustrating that the remaining second insulating layers in FIG. 7 are omitted.
Figure 9:
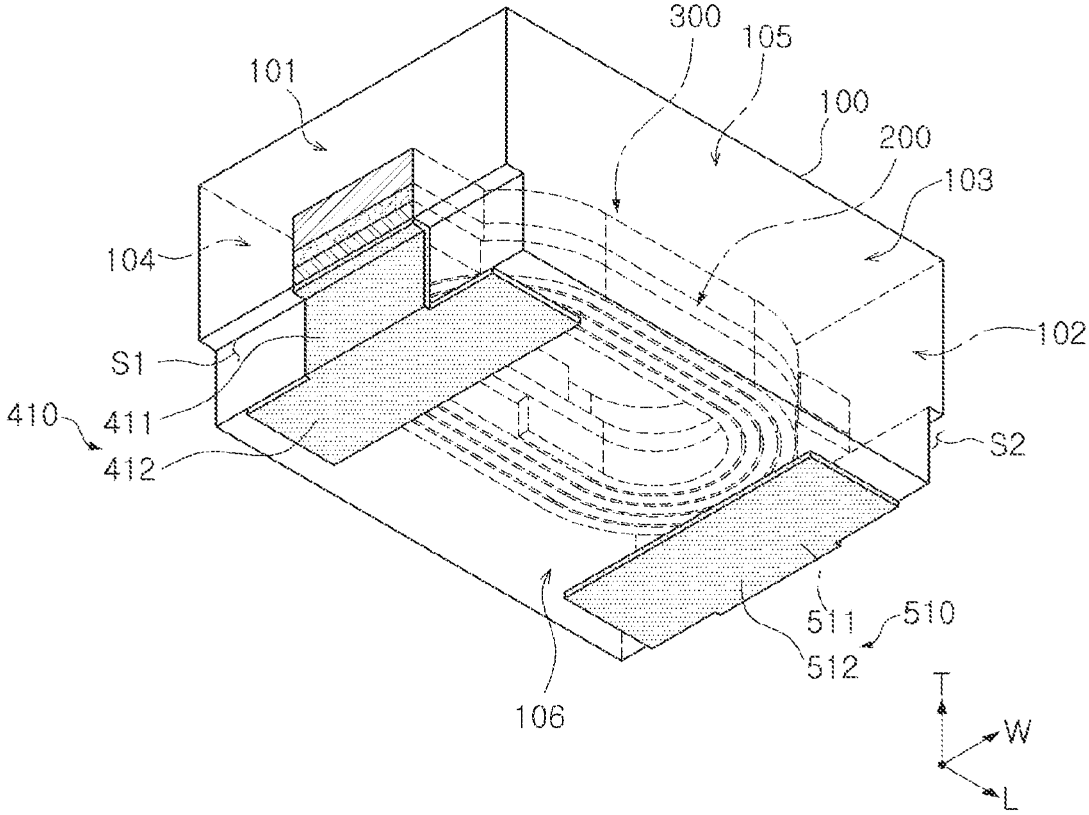
FIG. 9 is a diagram illustrating that a first insulating layer is omitted in FIG. 8.
Figure 10:
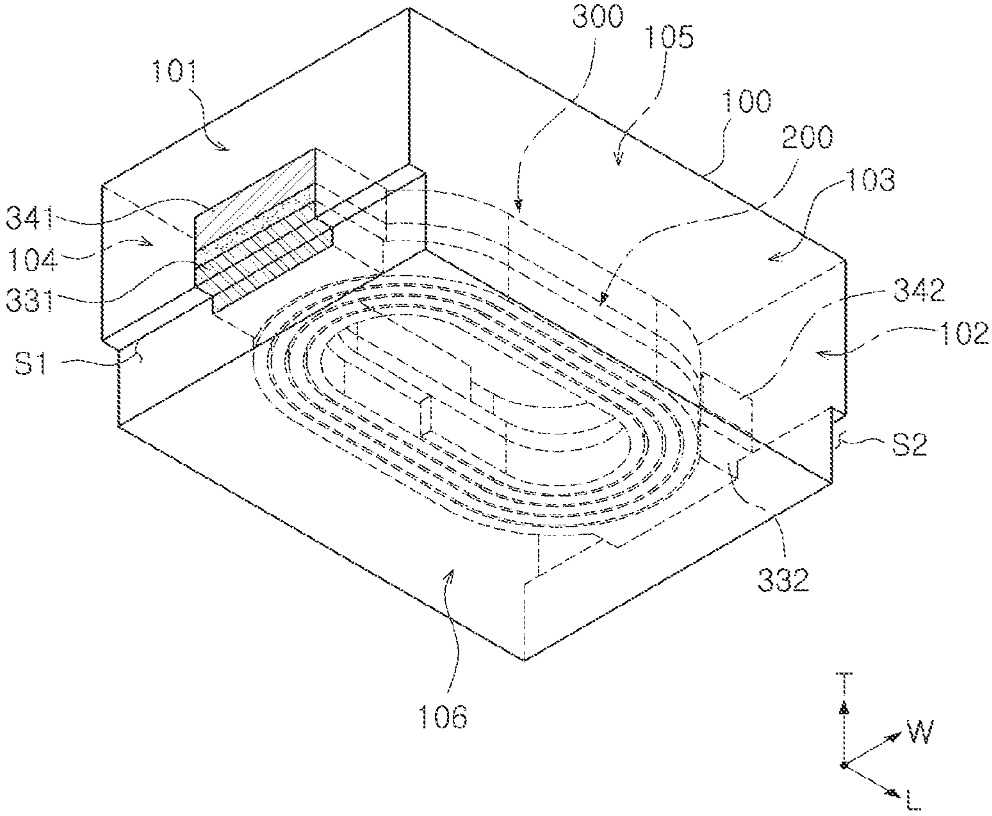
FIG. 10 is a diagram illustrating an external electrode is omitted in FIG. 9.
Figure 11:
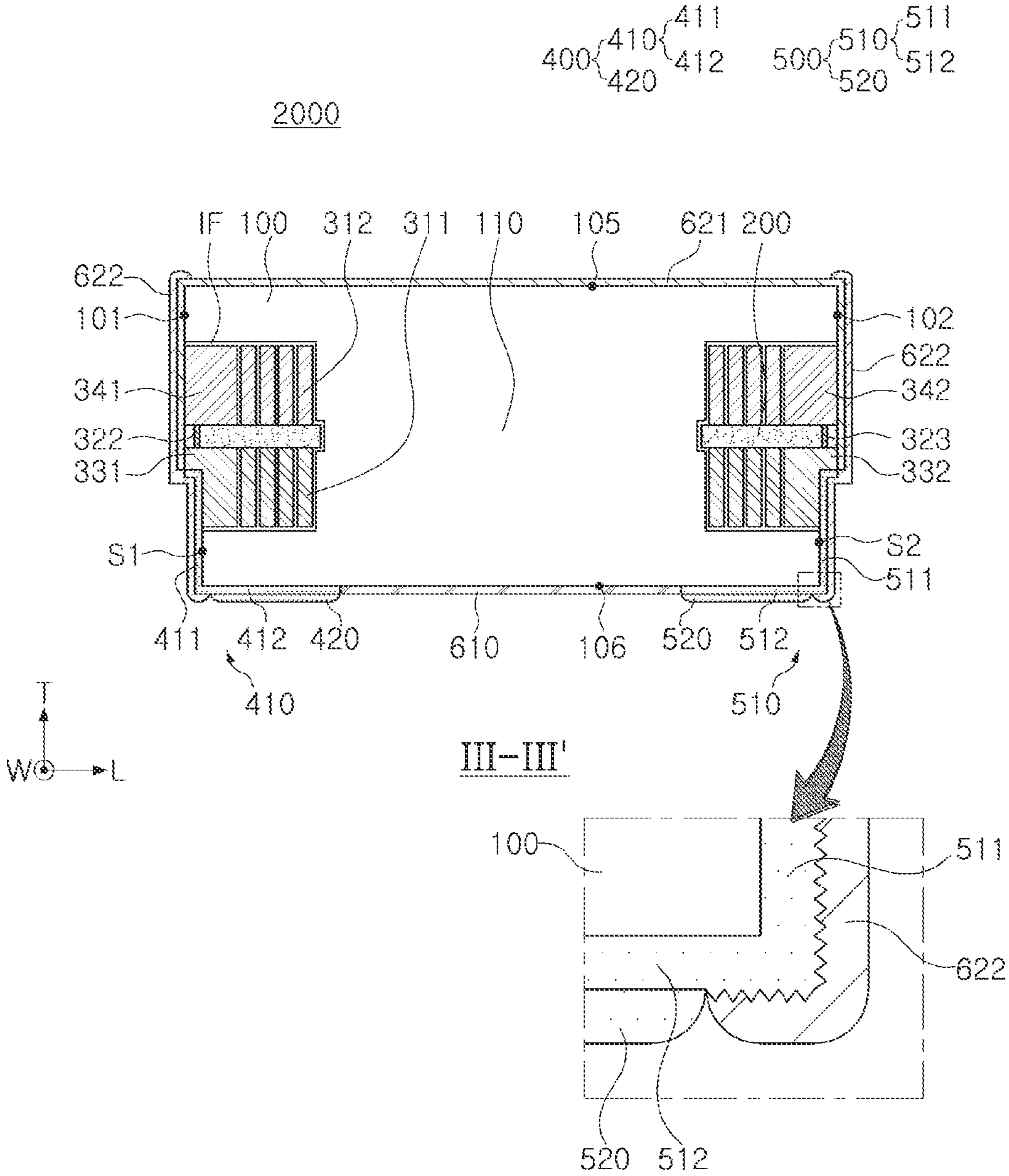
FIG. 11 is a diagram illustrating a cross-section taken along line of FIG. 5.
Figure 12:
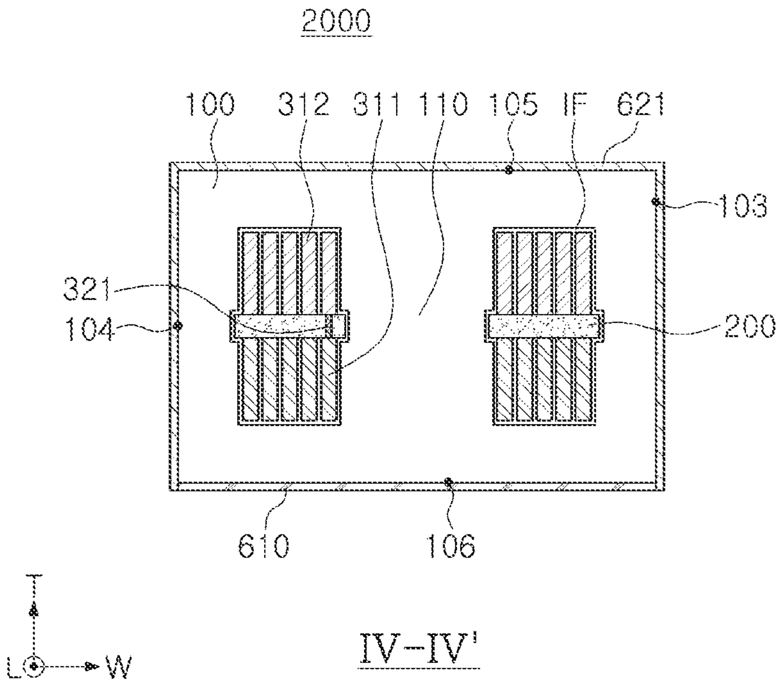
FIG. 12 is a diagram illustrating a cross-section taken along line IV-IV' of FIG. 5.
Figure 13:
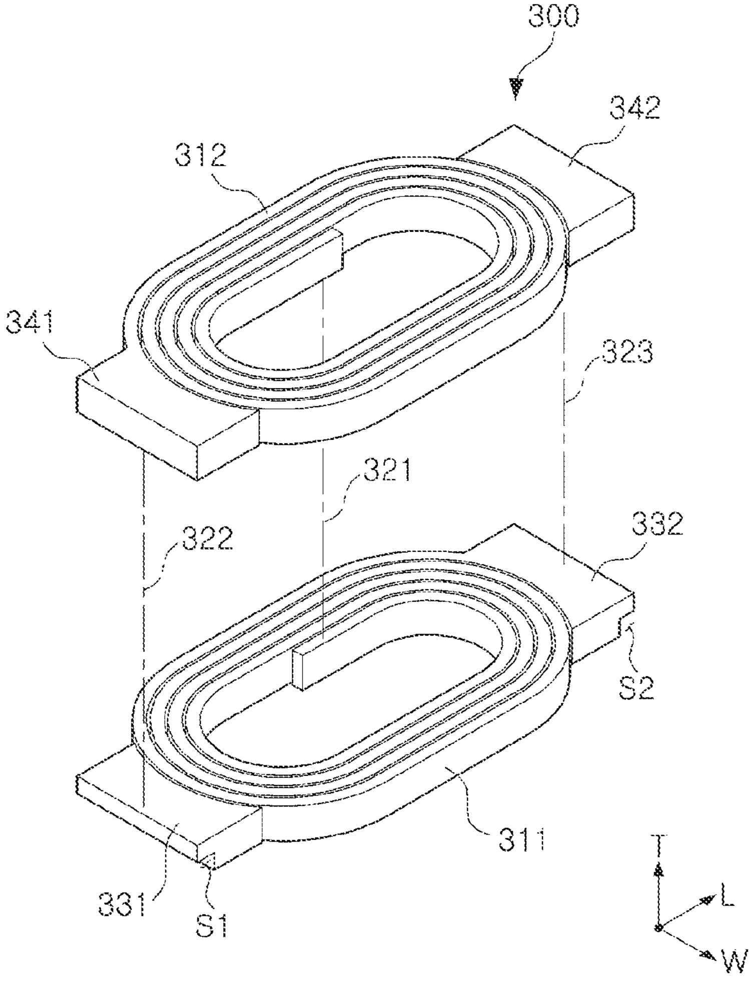
FIG. 13 is a diagram illustrating an exploded coil portion.

FIG. 5 is a diagram schematically showing a coil component according to another embodiment of the present disclosure. FIG. 6 is a diagram showing a coil component viewed from a lower side according to another embodiment of the present disclosure. FIG. 7 is a diagram illustrating that some of the second insulating layers are omitted in FIG. 6. FIG. 8 is a diagram illustrating that the remainder of the second insulating layers are omitted in FIG. 7. FIG. 9 is a diagram illustrating that the first insulating layer is omitted from FIG. 8. FIG. 10 is a diagram illustrating that an external electrode is omitted from FIG. 9. FIG. 11 is a diagram illustrating a cross-section taken along line III-III' of FIG. 5. FIG. 12 is a diagram illustrating a cross-section taken along line IV-IV' of FIG. 5. FIG. 13 is a diagram showing an exploded coil portion. Meanwhile, in FIGS. 6 to 9, the second metal layers of each of the first and second external electrodes are omitted for understanding of the invention.

Referring to FIGS. 1 to 4, and 5 to 13, a coil component 2000 according to another embodiment of the present disclosure has a different structure of a body 100, a coil portion 300, and surface insulating layers 610 and 620, compared to the coil component 1000 according to an embodiment of the present disclosure. Accordingly, in describing the present embodiment, only the body 100, the coil portion 300, and the surface insulating layers 610 and 620, different from those in the embodiment of the present disclosure will be described. For the remainder of the configuration of the present embodiment, the description in the embodiment of the present disclosure may be applied as it is.

Referring to FIGS. 5 to 13, a coil component 2000 according to another embodiment of the present disclosure includes slit portions S1 and S2 formed in the body 100. The coil portion 300 includes dummy lead-out patterns 341 and 342 and first to third vias 321, 322, and 323.

The first and second slit portions S1 and S2 are formed in a corner portion between each of the first and second surfaces 101 and 102 of the body 100 and the sixth surface 106 of the body 100. Specifically, the first slit portion S1 is formed in a corner portion between the first surface 101 of the body 100 and the sixth surface 106 of the body 100, and the second slit portion S2 is formed in a corner portion between the second surface 102 of 100 and the sixth surface 106 of the body 100. Meanwhile, in the first and second slit portions S1 and S2, a depth at which the lead-out patterns 331 and 332 to be described later may be exposed to inner surfaces of the first and second slit portions S1 and S2 (a dimension of the first and second slit portions S1 and S2 in the thickness direction T), but the first and second slit portions S1 and S2 do not extend to the fifth surface 105 of the body 100. That is, the first and second slit portion S1 and S2 do not penetrate through the body 100 in the thickness direction T.

The first and second slit portions S1 and S2 extend to the third and fourth surfaces 103 and 104 of the body 100 in the width direction W of the body 100, respectively. That is, the first and second slit portions S1 and S2 may have a shape of a slit formed in the entire width direction W of the body 100. At a coil bar level, which is a state before each coil component is individualized, the first and second slit portions S1 and S2 may be formed by performing pre-dicing on one surface of a coil bar along a boundary line coinciding with the width direction of each coil component among the boundary lines for individualizing each coil component. The depth during pre-dicing is adjusted so that the lead-out patterns 331 and 332 are exposed.

Meanwhile, the inner surfaces (inner walls and bottom surfaces) of the slit portions S1 and S2 also constitute the surface of the body 100, but in the present specification, for convenience of description, the inner surfaces of the slit portions S1 and S2 will be distinguished from the surface of the body 100. In addition, in FIGS. 5 to 13, although it is illustrated that the first and second slit portions S1 and S2 have inner walls, parallel to the first and second surfaces 101 and 102 of the body 100 and of the body 100 and bottom surfaces, parallel to the fifth and sixth surfaces 105 and 106 of the body 100, the scope of the present embodiment is not limited thereto.

For example, the first slit portion S1 may be formed such that the inner surface thereof has a curved shape connecting the first surface 101 and the sixth surface 106 of the body, based on a cross-section of a length direction (L)-a thickness direction (T) (a LT cross-section) of the coil component 1000 according to the present embodiment. However, hereinafter, for convenience of description, it will be described that the slit portions S1 and S2 have inner walls and bottom surfaces. The coil portion 300 includes coil patterns 311 and 312, vias 321, 322, and 323, lead-out patterns 331 and 332, and dummy lead-out patterns 341 and 342. Specifically, based on a direction of FIGS. 5, 11, 12, and 13, the first coil pattern 311, the first lead-out pattern 331, and the second lead-out pattern 332 may be disposed on the lower surface of the support substrate 200, opposing the sixth surface 106 of the body 100, and the second coil pattern 312, the first dummy lead-out pattern 341, and the second dummy lead-out pattern 342 may be disposed on the upper surface of the support substrate 200, opposing the lower surface of the support substrate 200. The first coil pattern 311 may be disposed to be spaced apart from the first lead-out pattern 331 and may be connected to be in contact with the second lead-out pattern 332 on the lower surface of the support substrate 200. The second coil pattern 312 may be connected to be in contact with the first lead-out pattern 331, and may be spaced apart from the second dummy lead-out pattern 342 on the upper surface of the support substrate 200. The first via 321 may penetrate through the support substrate 200 and may be connected to be in contact with the inner end portion of each of the first coil pattern 311 and the second coil pattern 312. The second via 322 may penetrate through the support substrate 200 and may be connected to be in contact with the first lead-out pattern 331 and the first dummy lead-out pattern 341, respectively. The third via 323 may penetrate through the support substrate 200 and may be connected to be in contact with the second lead-out pattern 332 and the second dummy lead-out pattern 342, respectively. Thereby, the coil portion may function as a single coil as a whole.

The first lead-out pattern 331 and the second lead-out pattern 332 are exposed to the first and slit portions S1 and S2. Specifically, the first lead-out pattern 331 may be exposed to the inner surface of the first slit portion Si, and the second lead-out pattern 332 may be exposed to the inner surface of the second slit portion S2. Since the connection portions 411 and 511 of the first metal layers 410 and 510 of the external electrodes 400 and 500 are disposed in the first and second slit portions S1 and S2, the coil portion 300 and the external electrodes 400 and 500 are connected to be in contact with each other.

One surface of the lead-out patterns 331 and 332 exposed to the inner surfaces of the first and second slit portions S1 and S2 may have higher surface roughness than the other surfaces of the lead-out patterns 331 and 332. For example, when the lead-out patterns 331 and 332 (S1 and S2 first and second slit portions after electroplating) are formed, a portion of the lead-out patterns 331 and 332 may be removed from a process of forming the slit portions. Accordingly, one surface of the lead-out patterns 331 and 332, exposed to the inner surfaces of the first and second slit portions S1 and S2 may have higher surface roughness compared to the remaining surface of the lead-out patterns 331 and 332 due to polishing of a dicing tip. The first metal layers 410 and 510 may be formed of a thin film so that the bonding force with the coil portion 300 may be relatively weak, and since the connection portions 411 and 511 of the first metal layers 410 and 510 are connected to be in contact with one surface of the lead-out patterns 331 and 332 having relatively high surface roughness, the bonding force between the first metal layers 410 and 510 and the lead-out patterns 331 and 332 may be improved.

The lead-out patterns 331 and 332 and the dummy lead-out patterns 341 and 342 may be exposed to the first and second surfaces 101 and 102 of the body 100, respectively. That is, the first lead-out pattern 331 may be exposed to the first surface 101 of the body 100, and the second lead-out pattern 332 may be exposed to the second surface 102 of the body 100. Accordingly, as shown in FIG. 10, the first lead-out pattern 331 may be continuously exposed to the inner wall of the first slit portion S1, the bottom surface of the first slit portion S1 and the first surface 101 of the body 100, and the second lead-out pattern 332 may be continuously exposed to the inner wall of the second slit portion S1, the bottom surface of the second slit portion S2, and the second surface 102 of the body 100.

Each of the first metal layers 410 and 510 of the external electrodes 400 and 500 is formed along the bottom surfaces and inner walls of the slit portions S1 and S2 and along the sixth surface 106 of the body 100. That is, each of the first metal layers 410 and 510 is formed in a form of a conformal film on the inner surfaces of the slit portions S1 and S2 and on the sixth surface 106 of the body 100.

The connection portions 411 and 511 may be disposed at a central portion of the first and second slit portions S1 and S2 so as to be spaced apart from the third and fourth surfaces 103 and 104 of the body 100, respectively. That is, the connection portions 411 and 511 may be disposed at the central portion of the inner surfaces of the first and second slit portions S1 and S2 in the width direction W. Since the lead-out patterns 331 and 332 are exposed to the central portion of the inner surfaces of the first and second slit portions S1 and S2 in the width direction W, the connection portions 411 and 511 may be formed only in a region of the inner surfaces of the first and second slit portions S1 and S1 to which the lead-out patterns 331 and 332 are exposed.

The pad portions 412 and 512 may be disposed on the sixth surface 106 of the body 100 to be spaced apart from each of the third and fourth surfaces 103 and 104 of the body 100. In this case, it is possible to prevent the coil component 1000 according to the present embodiment from being in short-circuit with other components mounted externally of the width direction W, such as on a mounting substrate, or the like.

At least one of distances from each of the third and fourth surfaces 103 and 104 of the body 100 to the pad portions 412 and 512 may be longer than at least one of distances from each of the third and fourth surfaces 103 and 104 of the body 100 to the connection portions 411 and 511. For example, a length d1 of the connection portions 411 and 511 in the width direction W may be less than a length d2 of the pad portions 412 and 512 in the width direction W. The sixth surface 106 of the body 100 may be used as a mounting surface when mounting the coil component 1000 according to the present embodiment on a mounting substrate, or the like, and the second metal layers 420 and 520 disposed in the pad portions 412 and 512 of the external electrodes 400 and 500 may be connected to a connection pad of the mounting substrate through a coupling member such as a solder and the like. In this case, since the length d2 of the pad portions 412 and 512 in the width direction W is greater than the length d1 of the connection portions 411 and 511 in the width direction W, an area of the pad portions 412 and 512 in which the metal layers 420 and 520 and the coupling member such as a solder, or the like, are formed thereon may be increased. In addition, since the length d1 of the connection portions 411 and 511 in the width direction W is less than the length d2 of the pad portions 412 and 512 in the width direction W, short-circuit with other components mounted to be the most adjacent to the mounting substrate in the length direction L may be prevented. That is, among the configurations of the external electrodes 400 and 500, the size (the length d1 in the width direction W) of the connection portions 411 and 511 disposed to be the most adjacent to other components during mounting may be formed to be relatively small, such that the possibility of short-circuit with other components may be reduced.

In the case of the present embodiment, the surface insulating layers 610 and 620 may include a first insulating layer 610 disposed on the first and second slit portions S1 and S2 and the sixth surface 106 of the body 100 to allow the connection portions 411 and 511 to be spaced apart from each of the third and fourth surfaces 103 and 104 of the body 100, and a second insulating layer 620 disposed on the first and second surfaces 101 and 102 of the body 100 to cover the connection portions 411 and 511.

The first insulating layer 610 is disposed on the first and second slits S1 and S2. An opening O exposing the connection portions 411 and 511 may be formed in the first insulating layer 610. Specifically, referring to FIG. 8, the first insulating layer 610 is formed to fill the first and second slit portions S1 and S2, and is disposed to be spaced apart from each other on an inner surface of each of the first and second slit portions S1 and S2. In the first insulating layer 610 disposed in the first and second slit portions S1 and S2, a distance from one surface, in contact with an inner wall of the first and second slit portions S1 and S2 to the other surface, opposing the one surface of the first insulating layer 610 may correspond to a width of the first and second slit portions S1 and S2 (a distance along a length direction L, from the first and second surfaces 101 and 102 of the body 100 to the inner wall of the first and second slit portions S1 and S2). As a result, the other surface of the first insulating layer 610 disposed on the slit portions S1 and S2 may be disposed on substantially the same plane as the first and second surfaces 101 and 102 of the body 100. Since the first insulating layer 610 is formed to fill the first and second slit portions S1 and S2 as a whole, compared to the case in which the first insulating layer 610 is not formed in the first and second slit portions S1 and S2, appearance defects of the coil component 2000 according to the present disclosure may be reduced.

The first insulating layer 610 may extend from inner surfaces of the first and second slit portions S1 and S2 to the sixth surface 106 of the body 100, and may expose pad portions 412 and 512. The first insulating layer 610 may be disposed externally of both ends of each of the pad portions 412 and 512 in the width direction W on the sixth surface 106 of the body 100, to allow the pad portions 412 and 512 to be spaced apart from each of the third and fourth surfaces 103 and 104 of the body 100. The first insulating layer 610 may prevent the coil component 2000 according to the present embodiment from being in short-circuit with other components mounted to be adjacent in the width direction W. In addition, in mounting the coil component 2000 according to the present embodiment on a mounting substrate, or the like, due to a size occupied by a coupling member such as a solder, or the like, the first insulating layer 610 may prevent an increase in an effective mounting area occupied by the coil component 2000 according to the present embodiment in the mounting substrate.

A region of the first insulating layer 610 disposed on the slit portions S1 and S2 and a region of the first insulating layer 610 disposed on the sixth surface 106 of the body 100 may be integrally formed with each other. For example, the region of the first insulating layer 610 disposed on the slit portions S1 and S2 and the region of the first insulating layer 610 disposed on the sixth surface 106 of the body 100 may be formed together in the same process using the same insulating material, such that a boundary therebetween may not be formed. For example, the first insulating layer 610 may be formed by a screen printing method using an insulating paste, an inkjet printing method, or the like, to be integrally formed with each other. Meanwhile, in the present embodiment, before the first metal layers 410 and 510 of the external electrodes 400 and 500 are formed, a first insulating layer 610 may be formed on the slit portions S1 and S2 and the sixth surface 106 of the body 100. Accordingly, in selectively forming the first metal layers 410 and 510 on the sixth surface 106 of the body 100 and the inner surfaces of the first and second slit portions S1 and S2, the first insulating layer 610 may function as a mask. For example, the first insulating layer 610 may function as a plating resist in forming the first metal layers 410 and 510 by a plating method.

The first insulating layer 610 may be collectively formed on each coil component at a coil bar level in a state before each coil component is individualized. That is, the process of forming the first insulating layer 610 may be performed between the aforementioned pre-dicing process and an individualization process (a full dicing process).

The second insulating layer 620 is disposed on the first and second surfaces 101 and 102 of the body 100, and covers the connection portions 411 and 511. In the present embodiment, the second insulating layer 620 includes a cover layer 621 covering the first to fifth surfaces 101, 102, 103, 104, and 105 of the body 100, and a finish layer 622 disposed on the first and second surfaces 101 and 102 of the body 100 to cover the connection portions 411 and 511.

The cover layer 621 is disposed on the first to fifth surfaces 101, 102, 103, 104, and 105 of the body 100 and extends onto the inner surfaces of the slit portions S1 and S2 to form a first insulating layer 610 disposed on the inner surfaces of the slit portion S1 and S2. The cover layer 621 does not extend to the first insulating layer 610 disposed on the sixth surface 106 of the body 100. Meanwhile, the opening O may also be formed to extend in the cover layer 621 to expose the connection portions 411 and 511 externally. In this case, the cover layer 621 may also function as a mask together with the first insulating layer 610 in selectively forming the first metal layers 410 and 510 of the external electrodes 400 and 500 on the body 100. Accordingly, the cover layer 621 may be formed in a process between a process of forming the first insulating layer 610 and a process of forming the first metal layers 410 and 510. The cover layer 621 is in contact with each of the first to fifth surfaces 101, 102, 103, 104, and 105 of the body 100, and is in contact with the other surface of the first insulating layer 610 on the inner walls of the slit portions S1 and S2. The process of forming the cover layer 621 may be performed after the process of individualizing the coil bar is completed.

The finish layer 622 is disposed on the first and second surfaces 101 and 102 of the body 100, respectively, to cover the cover layer 621 and the connection portions 411 and 511. In the present embodiment, a first insulating layer 610 may be formed on the surface of the body 100 and the inner surfaces of the slit portions S1 and S2, excluding a region in which the connection portions 411 and 511 and the pad portions 412 and 512 are to be formed, a temporary member may be attached to a region in which the connection portions 411 and 511 and the pad portions 412 and 512 are to be formed, a cover layer 621 may be formed on the first to fifth surfaces 101, 102, 103, 104, and 105 of the body 100, and after removing the temporary member to expose the lead-out patterns 331 and 332 externally, connection portions 411 and 511 and pad portions 412 and 512 may be formed in a region from which the temporary member is removed. For this reason, the connection portions 411 and 511 are exposed externally without being covered by the cover layer 621. The finish layer 622 is disposed on the first and second surfaces 101 and 102 of the body 100, respectively, to cover the connection portions 411 and 511 not covered by the cover layer 621.

Each of the cover layer 621 and the finish layer 622 may include a thermoplastic resin such as polystyrene, vinyl acetate, polyester, polyethylene, polypropylene, polyamide, rubber, acrylic, or the like, a thermosetting resin such as phenolic, epoxy, urethane, melamine, alkyd, or the like, a photosensitive resin, a parylene, $SiO_x$ or $SiN_x$. Each of the cover layer 621 and the finish layer 622 may further include an insulating filler such as an inorganic filler, but is not limited thereto.

Figure 14:
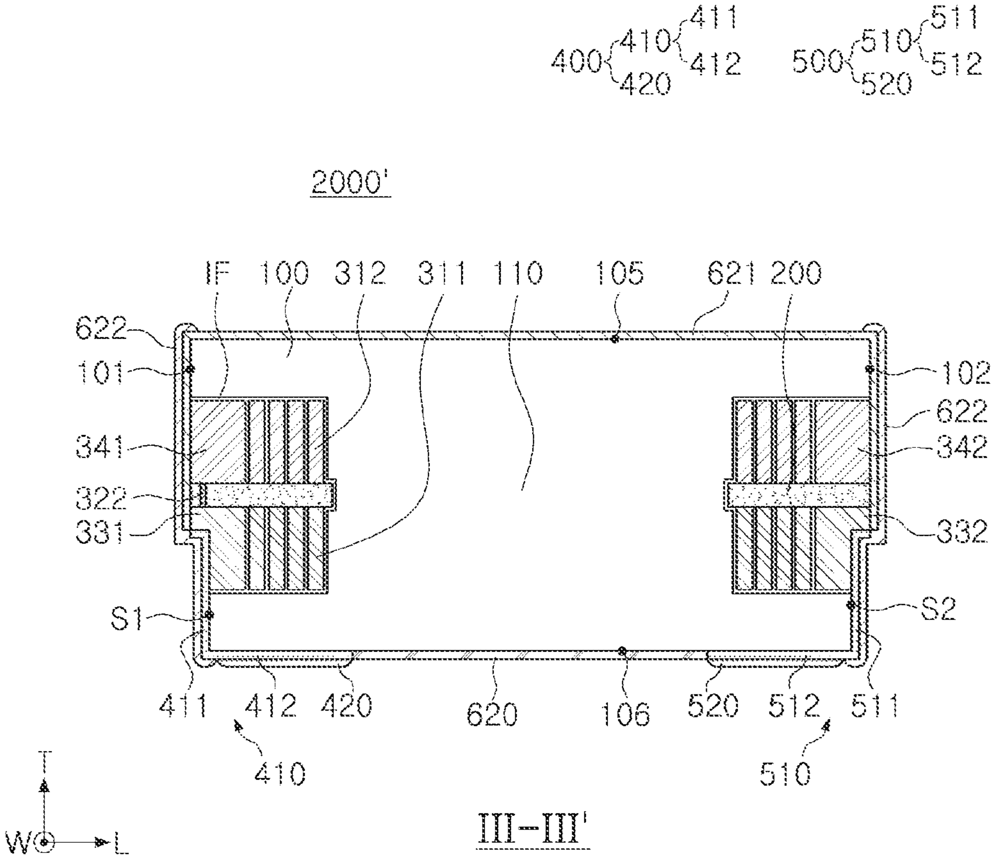
FIGS. 14 and 15 are diagrams schematically illustrating modified examples of a coil component according to another embodiment of the present disclosure, respectively, and a diagram corresponding to FIG. 11.
Figure 15:
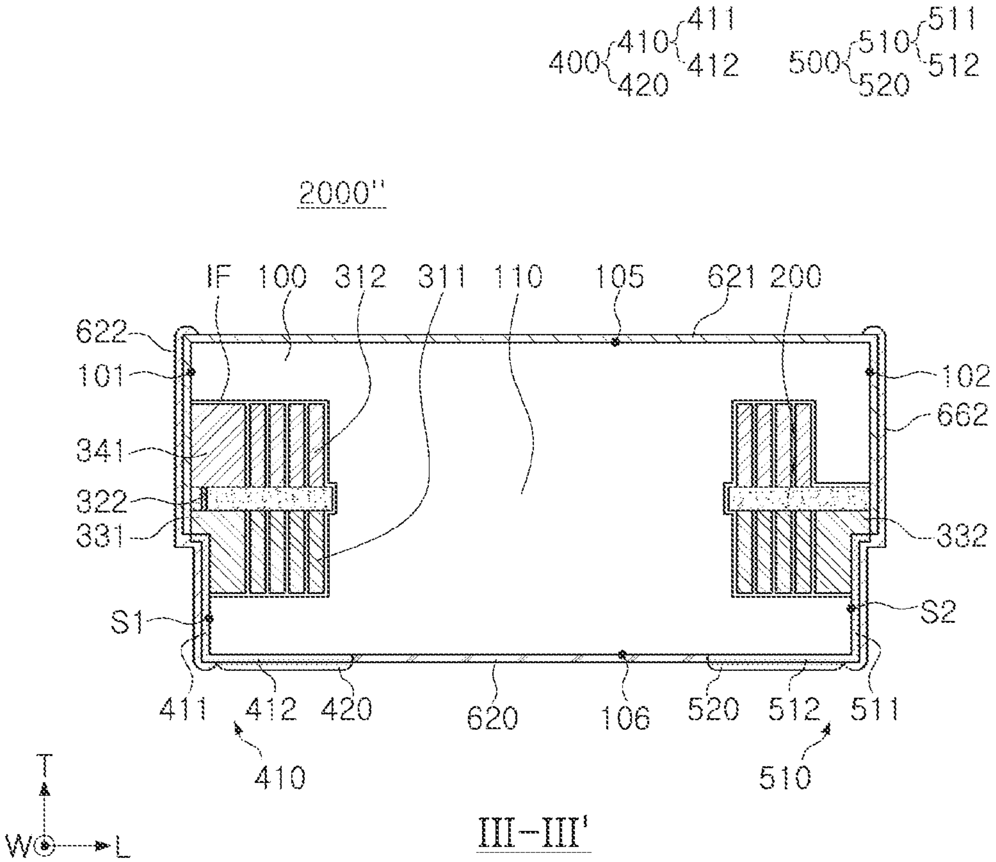

FIGS. 14 and 15 are diagrams schematically showing modified examples of a coil component 2000' and 2000" according to another embodiment of the present disclosure, respectively, and are diagrams corresponding to FIG. 11.

Referring to FIG. 14, in the case of a modified example of another embodiment of the present disclosure, the above-described third via 323 may be omitted. That is, referring to FIG. 13, in the case of a second dummy lead-out pattern 342, since the configuration thereof is irrelevant to an electrical connection between the coil portion 300 and the external electrodes 400 and 500, in the present modified example, a third via 323 for connection between the second lead-out pattern 332 and the second dummy lead-out pattern 342 is omitted. However, in the present modified example, since the second dummy lead-out pattern 342 is not omitted, warpage of the support substrate 200 during the process can be minimized.

Referring to FIG. 15, in the case of another modified example of another embodiment of the present disclosure, as in the modified example shown in FIG. 14, the third via 323 may be omitted, and the second dummy lead-out pattern 342 may be additionally omitted. In the present modified example, an effective volume of a magnetic material of the body 100 may be increased by a volume corresponding to a volume of the second lead-out pattern 342.

As set forth above, according to embodiments of the present disclosure, an electrical short-circuit between other external components may be prevented.

While the exemplary embodiments have been shown and described above, it will be apparent to those skilled in the art that modifications and variations could be made without departing from the scope of the present invention as defined by the appended claims.

What is claimed is:

1. A coil component, comprising:

a body;

a coil portion disposed in the body;

an external electrode portion including a first metal layer disposed on the body, and connected to the coil portion; and a surface insulating layer disposed on the body to cover a first region of the first metal layer and open a second region of the first metal layer, wherein surface roughness of an interface of the first region of the first metal layer with the surface insulating layer is higher than surface roughness of an outer surface of the second region of the first metal layer.

2. The coil component of claim 1, wherein the first metal layer comprises copper oxide (I) ($Cu_2O$) at an interface with the surface insulating layer.

3. The coil component of claim 1, wherein the first metal layer comprises copper oxide (II) (CuO) at an interface with the surface insulating layer.

4. The coil component of claim 1, wherein the body has a first surface and a first end surface and a second end surface respectively connected to the first surface and opposing each other, and the body further comprises a support substrate disposed in the body, wherein the coil portion comprises first and second coil patterns respectively disposed on a first surface and a second surface of the support substrate, opposing each other, and first and second lead-out patterns respectively connected to the first and second coil patterns, and wherein the external electrode portion comprises first and second external electrodes disposed to be spaced apart from each other on the first surface of the body.

5. The coil component of claim 4, wherein the first and second lead-out patterns are exposed to the first end surface and the second end surface of the body, respectively, wherein the first metal layer of each of the first and second external electrodes comprises a connection portion disposed on the first end surface and the second end surface of the body to be in contact with the first and second lead-out patterns, respectively, and a pad portion disposed on the first surface to be spaced apart from each other, and wherein the surface insulating layer covers the connection portion of each of the first and second external electrodes and opens the pad portion of each of the first and second external electrodes.

6. The coil component of claim 5, wherein each of the first and second external electrodes further comprises a second metal layer disposed on the pad portion of the first metal layer.

7. The coil component of claim 5, wherein the surface insulating layer comprises a first insulating layer disposed on the first surface of the body to open the pad portion of each of the first and second external electrodes, and a second insulating layer disposed on the first end surface and the second end surface of the body to cover the connection portion of each of the first and second external electrodes.

8. The coil component of claim 7, wherein the body further has a second surface opposing the first surface of the body, and a first side surface and a second side surface respectively connecting the first end surface and the second surface of the body, and opposing each other, and wherein the second insulating layer is disposed to extend onto at least a portion of each of the first surface, the second surface, the first side surface, and the second side surface of the body.

9. The coil component of claim 4, further comprising first and second slit portions formed at a corner portion between each of the first end surface and the second end surface of the body and the first surface of the body, and exposing the first and second lead-out patterns, wherein the first metal layer of each of the first and second external electrodes comprises a connection portion disposed on the first and second slit portions to be in contact with the first and second lead-out patterns, respectively, and a pad portion disposed on the first surface of the body to be spaced apart from each other, and wherein the surface insulating layer covers the connection portion of each of the first and second external electrodes and opens the pad portion of each of the first and second external electrodes.

10. The coil component of claim 9, wherein the body further has a first side surface and a second side surface connecting the first end surface and the second end surface of the body and opposing each other, and wherein the connection portion of each of the first and second external electrodes is disposed in a central portion of the first and second slit portions to be spaced apart from each of the first side surface and the second side surface of the body.

11. The coil component of claim 10, wherein the pad portion of each of the first and second external electrodes is spaced apart from each of the first side surface and the second side surface of the body.

12. The coil component of claim 10, wherein the surface insulating layer comprises a first insulating layer disposed on the first surface of the body to open the pad portion of each of the first and second external electrodes, and a second insulating layer disposed on the first end surface and the second end surface of the body and extending onto the first and second slit portions to cover the connection portion of each of the first and second external electrodes.

13. The coil component of claim 9, wherein the coil portion further comprises a first via penetrating through the support substrate and connecting an inner end portion of each of the first and second coil patterns to each other, wherein the first lead-out pattern is disposed on the first surface of the support substrate to be spaced apart from the first coil pattern, and wherein the second lead-out pattern is disposed on the first surface of the support substrate to be in contact with the first coil pattern.

14. The coil component of claim 13, wherein the coil portion further comprises:

a first dummy lead-out pattern disposed on the second surface of the support substrate to be in contact with the second coil pattern; and a second via penetrating through the support substrate and connecting the first lead-out pattern and the first dummy lead-out pattern to each other.

15. The coil component of claim 14, wherein the coil portion further comprises a second dummy lead-out pattern disposed on the second surface of the support substrate to be spaced apart from each of the second coil pattern and the first dummy lead-out pattern.

16. The coil component of claim 15, wherein the coil portion further comprises a third via penetrating through the support substrate and connecting the second lead-out pattern and the second dummy lead-out pattern to each other.

17. A coil component, comprising:

a body having first and second end surfaces opposing each other and a first surface connecting the first and second end surfaces to each other;

a coil portion disposed in the body;

first and second external electrode portions disposed on the first and second end surfaces of the body, respectively, and connected to the coil portion, each of the first and second external electrode portions including a first metal layer extending onto the first surface of the body; and a surface insulating layer disposed on the body, wherein the first metal layer of each of the first and second external electrode portions comprises a connection portion disposed on the first and second end surfaces of the body to be connected to the coil portion, and a pad portion disposed on the first surface of the body and spaced apart from each other, and the surface insulating layer covers the connection portion of each of the first and second external electrode portions and opens a portion of the pad portion of each of the first and second external electrode portions, wherein each of the first and second external electrodes further comprises a second metal layer disposed on the portion of the pad portion of the first metal layer.

18. The coil component of claim 17, wherein surface roughness of an interface between the connection portion and the surface insulating layer is higher than surface roughness of the portion of the pad portion and the second metal layer.

19. The coil component of claim 17, wherein a width of the connection portion is larger than a width of the pad portion.

20. The coil component of claim 17, wherein a width of the connection portion is smaller than a width of the pad portion.

21. A coil component, comprising:

a body;

a coil portion disposed in the body;

an external electrode portion including a first metal layer disposed on the body, and connected to the coil portion; and a surface insulating layer disposed on the body to cover a first region of the first metal layer and open a second region of the first metal layer, wherein the external electrode portion further includes a second metal layer disposed on the second region of the first metal layer, and wherein surface roughness of an interface of the first region of the first metal layer with the surface insulating layer is different from surface roughness of the second region of the first metal layer with the second metal layer.

22. The coil component of claim 21, wherein the second metal layer of the external electrode portion includes a nickel (Ni) plating layer disposed on the second region of the first metal layer and a tin (Sn) plating layer disposed on the nickel (Ni) plating layer.

23. The coil component of claim 21, wherein the body has a first surface and a first end surface and a second end surface respectively connected to the first surface and opposing each other, and further comprises a support substrate disposed in the body, wherein the coil portion comprises first and second coil patterns respectively disposed on a first surface and a second surface of the support substrate, opposing each other, and first and second lead-out patterns respectively connected to the first and second coil patterns, and wherein the external electrode portion comprises first and second external electrodes disposed to be spaced apart from each other on the first surface of the body.

24. The coil component of claim 23, wherein the first and second lead-out patterns are exposed to the first end surface and the second end surface of the body, respectively, wherein the first metal layer of each of the first and second external electrodes comprises a connection portion disposed on the first end surface and the second end surface of the body to be in contact with the first and second lead-out patterns, respectively, and a pad portion disposed on the first surface to be spaced apart from each other, and wherein the surface insulating layer covers the connection portion of each of the first and second external electrodes and opens the pad portion of each of the first and second external electrodes.

25. The coil component of claim 24, wherein the surface insulating layer comprises a first insulating layer disposed on the first surface of the body to open the pad portion of each of the first and second external electrodes, and a second insulating layer disposed on the first end surface and the second end surface of the body to cover the connection portion of each of the first and second external electrodes.

26. The coil component of claim 25, wherein the body further has a second surface opposing the first surface of the body, and a first side surface and a second side surface respectively connecting the first end surface and the second surface of the body, and opposing each other, and wherein the second insulating layer is disposed to extend onto at least a portion of each of the first surface, the second surface, the first side surface, and the second side surface of the body.

27. The coil component of claim 26, wherein a length of a corner portion of the second insulating layer on respective edges between the first surface, the second surface, the first side surface, and the second side surface of the body is greater than a length of a portion of the second insulating layer on respective centers of the first surface, the second surface, the first side surface, and the second side surface of the body.

* * * * *